(12) United States Patent
Sunkavalli et al.

(10) Patent No.: US 10,810,469 B2
(45) Date of Patent: Oct. 20, 2020

(54) EXTRACTING MATERIAL PROPERTIES FROM A SINGLE IMAGE

(71) Applicants: Adobe Inc., San Jose, CA (US); The Regents of the University of California, Oakland, CA (US)

(72) Inventors: Kalyan Sunkavalli, San Jose, CA (US); Zhengqin Li, San Diego, CA (US); Manmohan Chandraker, San Diego, CA (US)

(73) Assignee: ADOBE INC., San Jose, CA (US)

( * ) Notice: Subject to any disclaimer, the term of this patent is extended or adjusted under 35 U.S.C. 154(b) by 210 days.

(21) Appl. No.: 15/975,329

(22) Filed: May 9, 2018

(65) Prior Publication Data
US 2019/0347526 A1 Nov. 14, 2019

(51) Int. Cl.
*G06K 9/62* (2006.01)
*G06K 9/46* (2006.01)
*G06K 9/66* (2006.01)

(52) U.S. Cl.
CPC ............ *G06K 9/6267* (2013.01); *G06K 9/46* (2013.01); *G06K 9/6261* (2013.01); *G06K 9/66* (2013.01)

(58) Field of Classification Search
CPC ...... G06K 9/6267; G06K 9/46; G06K 9/6261; G06K 9/66; G06K 9/6248; G06K 9/4661; G06N 20/00; G06N 7/005; G06N 3/0454; G06N 3/084
See application file for complete search history.

(56) References Cited

U.S. PATENT DOCUMENTS

| | | | | |
|---|---|---|---|---|
| 2010/0039671 | A1* | 2/2010 | Matusik | H04N 1/2323 358/2.1 |
| 2011/0243450 | A1* | 10/2011 | Liu | G06K 9/6297 382/190 |
| 2013/0093883 | A1* | 4/2013 | Wang | H04N 1/00087 348/142 |
| 2013/0335434 | A1* | 12/2013 | Wang | G06N 20/00 345/581 |
| 2015/0117758 | A1* | 4/2015 | Chandraker | G06T 7/514 382/154 |

(Continued)

OTHER PUBLICATIONS

Zhengqin Li el al., "Materials for Masses: SVBRDF Acquisition with Single Mobile Phone Image", European Conference on Computer Vision (ECCV 2018), Sep. 8-14, 2018, Munich, Germany, pp. 1-16.*

(Continued)

*Primary Examiner* — Samir A Ahmed
(74) *Attorney, Agent, or Firm* — Keller Jolley Preece

(57) ABSTRACT

Systems, methods, and non-transitory computer-readable media are disclosed for extracting material properties from a single digital image portraying one or more materials by utilizing a neural network encoder, a neural network material classifier, and one or more neural network material property decoders. In particular, in one or more embodiments, the disclosed systems and methods train the neural network encoder, the neural network material classifier, and one or more neural network material property decoders to accurately extract material properties from a single digital image portraying one or more materials. Furthermore, in one or more embodiments, the disclosed systems and methods train and utilize a rendering layer to generate model images from the extracted material properties.

20 Claims, 14 Drawing Sheets

(56) References Cited

U.S. PATENT DOCUMENTS

| | | | |
|---|---|---|---|
| 2016/0187199 A1* | 6/2016 | Brunk | G06K 9/2036 |
| | | | 348/89 |
| 2017/0018114 A1* | 1/2017 | Stewart | G06T 7/40 |
| 2018/0047208 A1* | 2/2018 | Marin | H04N 13/243 |
| 2018/0232471 A1* | 8/2018 | Schissler | G06F 30/13 |
| 2018/0253869 A1* | 9/2018 | Yumer | G06T 11/60 |
| 2019/0228495 A1* | 7/2019 | Tremblay | B25J 9/1697 |

OTHER PUBLICATIONS

M. Aittala, T. Aila, and J. Lehtinen. Reflectance modeling by neural texture synthesis. *ACM Transactions on Graphics (TOG)*, 35(4):65, 2016.

M. Aittala, T. Weyrich, J. Lehtinen, et al. Two-shot svbrdf capture for stationary materials. *ACM Trans. Graph.*, 34(4):110-1, 2015.

S. Bell, P. Upchurch, N. Snavely, and K. Bala. Material recognition in the wild with the materials in context database. *Computer Vision and Pattern Recognition (CVPR)*, 2015.

J. F. Blinn and M. E. Newell. Texture and reflection in computer generated images. Communications of the ACM, 19(10):542-547, 1976.

B. Burley. Physically-based shading at disney. In *ACM SIGGRAPH 2012 Courses*, 2012.

M. Chandraker. On shape and material recovery from motion. In *European Conference on Computer Vision*, pp. 202-217. Springer, 2014.

M. Chandraker. What camera motion reveals about shape with unknown brdf. In *Proceedings of the IEEE Conference on Computer Vision and Pattern Recognition*, pp. 2171-2178, 2014.

M. Chandraker. The information available to a moving observer on shape with unknown, isotropic brdfs. IEEE transactions on pattern analysis and machine intelligence, 38(7):1283-1297, 2016.

A. X. Chang, T. Funkhouser, L. Guibas, P. Hanrahan, Q. Huang, Z. Li, S. Savarese, M. Savva, S. Song, H. Su, et al. Shapenet: An information-rich 3d model repository. arXiv preprint arXiv:1512.03012, 2015.

C. B. Choy, D. Xu, J. Gwak, K. Chen, and S. Savarese. 3d-r2n2: A unified approach for single and multi-view 3d object reconstruction. In *European Conference on Computer Vision*, pp. 628-644. Springer, 2016.

R. L. Cook and K. E. Torrance. A reflectance model for computer graphics. *ACM Transactions on Graphics (TOG)*, 1(1):7-24, 1982.

P. Debevec, T. Hawkins, C. Tchou, H.-P. Duiker, W. Sarokin, and M. Sagar. Acquiring the reflectance field of a human face. In *Proceedings of the 27th annual conference on Computer graphics and interactive techniques*, pp. 145-156. ACM Press/Addison-Wesley Publishing Co., 2000.

D. Eigen and R. Fergus. Predicting depth, surface normals and semantic labels with a common multi-scale convolutional architecture. In *Proceedings of the IEEE International Conference on Computer Vision*, pp. 2650-2658, 2015.

S. Georgoulis, K. Rematas, T. Ritschel, M. Fritz, L. Van Gool, and T. Tuytelaars. Delight-net: Decomposing reflectance maps into specular materials and natural illumination. arXiv preprint arXiv:1603.08240, 2016.

Z. Hui and A. C. Sankaranarayanan. A dictionary-based approach for estimating shape and spatially-varying reflectance. In *International Conference on Computational Photography (ICCP)*, 2015.

Z. Hui, K. Sunkavalli, J.-Y. Lee, S. Hadap, J. Wang, and A. C. Sankaranarayanan. Reflectance capture using univariate sampling of BRDFs. In *IEEE Intl. Conf. Computer Vision* (ICCV), 2017.

B. Karis and E. Games. Real shading in unreal engine 4. *Proc. Physically Based Shading Theory Practice*, 2013.

K. Kim, J. Gu, S. Tyree, P. Molchanov, M. Nießner, and J. Kautz. A lightweight approach for on-the-fly reflectance estimation. *arXiv preprint* arXiv:1705.07162, 2017.

D. Kingma and J. Ba. Adam: A method for stochastic optimization. *arXiv preprint* arXiv:1412.6980, 2014.

X. Li, Y. Dong, P. Peers, and X. Tong. Modeling surface appearance from a single photograph using self-augmented convolutional neural networks. *ACM Trans. Graph.*, 36(4):45:1-45:11, Jul. 2017.

G. Liu, D. Ceylan, E. Yumer, J. Yang, and J.-M. Lien. Material editing using a physically based rendering network. *ICCV*, 2017.

S. R. Marschner, S. H. Westin, E. P. Lafortune, K. E. Torrance, and D. P. Greenberg. Image-based brdf measurement including human skin. In *Rendering Techniques 99*, pp. 131-144. Springer, 1999.

W. Matusik, H. Pfister, M. Brand, and L. McMillan. A data- 937 driven reflectance model. *ACM Transactions on Graphics* 938 *(TOG)*, 22(3):759-769, 2003.

T. Narihira, M. Maire, and S. X. Yu. Direct intrinsics: Learning albedo-shading decomposition by convolutional regression. In *Proceedings of the IEEE International Conference on Computer Vision*, pp. 2992-2992, 2015.

P. K. Nathan Silberman, Derek Hoiem and R. Fergus. Indoor segmentation and support inference from rgbd images. In *ECCV*, 2012.

F. E. Nicodemus. Directional reflectance and emissivity of an opaque surface. *Applied optics*, 4(7):767-775, 1965.

J. B. Nielsen, H. W. Jensen, and R. Ramamoorthi. On optimal, minimal brdf sampling for reflectance acquisition. *ACM Transactions on Graphics (TOG)*, 34(6):186, 2015.

M. Oren and S. K. Nayar. Generalization of the lambertian model and implications for machine vision. *International Journal on Computer Vision (IJCV)*, 14(3):227-251, 1995.

G. Oxholm and K. Nishino. Shape and reflectance estimation in the wild. *IEEE Transactions on Pattern Analysis and Machine Intelligence (TPAMI)*, 38(2):376-389, 2016.

K. Rematas, T. Ritschel, M. Fritz, E. Gavves, and T. Tuytelaars. Deep reflectance maps. In *Proceedings of the IEEE Conference on Computer Vision and Pattern Recognition*, pp. 4508-4516, 2016.

K. Ristovski, V. Radosavljevic, S. Vucetic, and Z. Obradovic. Continuous conditional random fields for efficient regression in large fully connected graphs. In *AAAI*, 2013.

F. Romeiro, Y. Vasilyev, and T. Zickler. Passive reflectometry. In *European Conference on Computer Vision (ECCV)*, 2008.

F. Romeiro and T. Zickler. Blind reflectometry. In *European Conference on Computer Vision (ECCV)*, 2010.

E. Shelhamer, J. T. Barron, and T. Darrell. Scene intrinsics and depth from a single image. In *Proceedings of the IEEE International Conference on Computer Vision Workshops*, pp. 37-44, 2015.

J. Shi, Y. Dong, H. Su, and S. X. Yu. Learning non-lambertian object intrinsics across shapenet categories. *arXiv preprint* arXiv:1612.08510, 2016.

G. J. Ward. Measuring and modeling anisotropic reflection. *ACM Transactions on Graphics (TOG)*, 26(2):265-272, 1992.

D. Xu, E. Ricci, W. Ouyang, X. Wang, and N. Sebe. Multi-scale continuous crfs as sequential deep networks for monocular depth estimation. *arXiv preprint* arXiv:1704.02157, 2017.

Z. Xu, J. B. Nielsen, J. Yu, H. W. Jensen, and R. Ramamoorthi. Minimal brdf sampling for two-shot near-field reflectance acquisition. *ACM Transactions on Graphics (TOG)*, 35(6):188, 2016.

\* cited by examiner

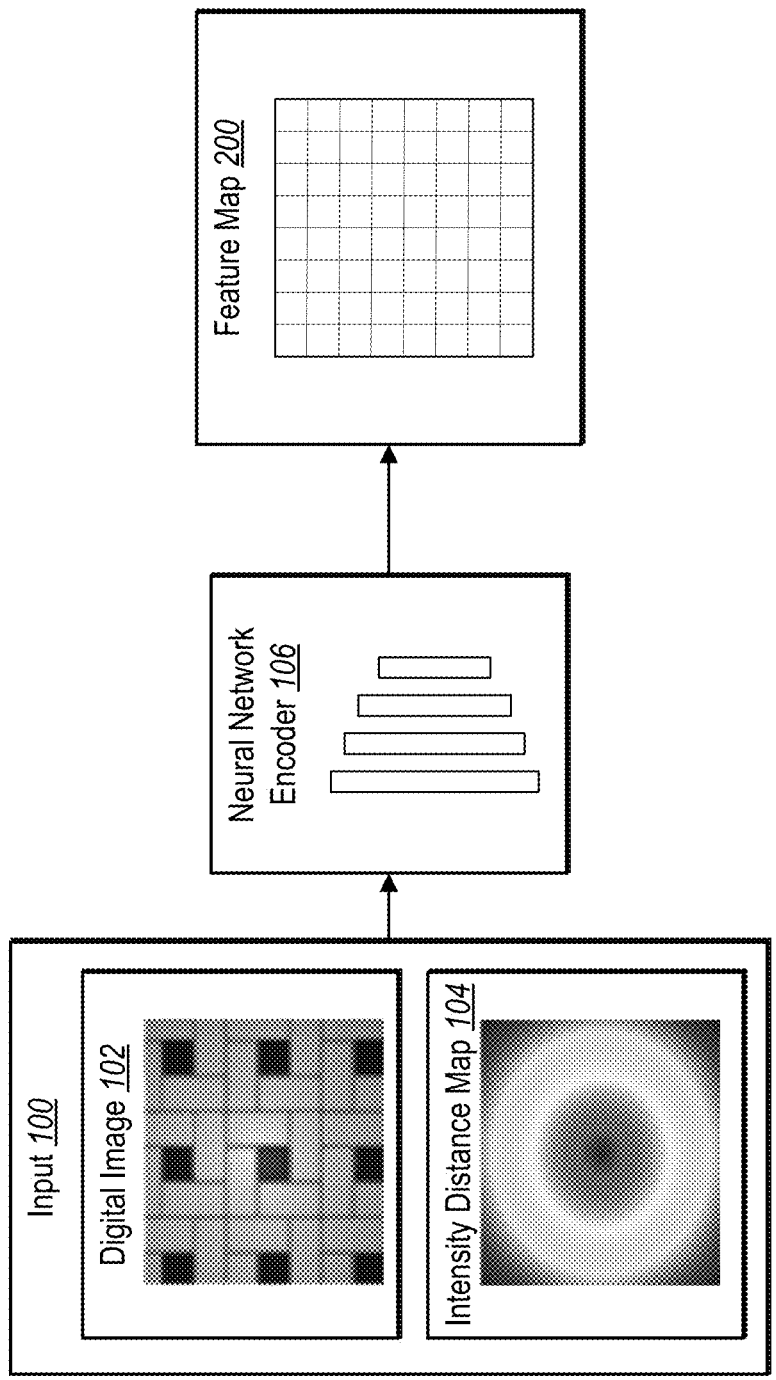

EXTRACTING MATERIAL PROPERTIES FROM A SINGLE IMAGE

BACKGROUND

Recent years have seen rapid development in the field of digital image processing and editing. Indeed, due to advances in algorithms and hardware, conventional digital image processing systems are now able to recover shapes from images with high accuracy. Although conventional digital image processing systems have progressed in recent years, they still have several significant shortcomings. For example, conventional digital image processing systems struggle to accurately estimate and extract material properties of objects in digital images. This is not surprising given the complexity of material properties and effects that shape and lighting have on material properties, making material property extraction an ill-posed problem.

Many conventional systems have sought to address these problems, but each introduce their own limitations and concerns. For example, some conventional systems require multiple digital images of the same object, along with camera and lighting calibrations, in order to accurately capture material properties from the object. Such systems offer little flexibility or wide application. Other conventional systems require expensive and powerful hardware systems for material capture from digital images. Such requirements may allow for an increased accuracy of captured material properties, but they also introduce additional significant costs and limit similarly limit wide application.

In addition, some conventional systems seek to identify and modify material properties of scenes portrayed in a digital image by making simplifying assumptions regarding the digital image. For example, some conventional systems assume geometry of objects portrayed in digital images, assume material properties of objects portrayed in digital images (e.g., assume diffuse materials), or assume lighting conditions (e.g., low frequency lighting) to reduce the complexity of extracting material properties portrayed in a digital image. Such simplifying assumptions may allow for increased ability to identify material properties, but they also introduce inaccuracies.

In addition, some conventional systems utilize machine learning processes to capture material properties from digital images. However, these solutions also introduce their own shortcomings. For example, some conventional systems that utilize machine learning are generally only capable of identifying a limited to modeling diffuse materials only (i.e., such systems cannot operate with specular materials). Some conventional machine learning based methods can only handle objects with the same constant material property. Other conventional machine learning based methods can handle restricted cases of spatially-varying material properties (e.g., stochastic textures). Furthermore, conventional systems that utilize machine learning are often unable to operate accurately in conjunction with complex material properties, which are generally not differentiable and impose difficulties in training neural networks. Also, some conventional systems require multiple neural networks to accurately capture material properties from digital images. Such systems utilize a large amount of computational resources to capture material properties.

Thus, there are several disadvantages to current methods for material capture from digital images.

SUMMARY

This disclosure describes one or more embodiments that provide benefits and/or solve one or more of the foregoing (or other) problems with systems, computer-readable media, and methods that allow for capture of material properties from a digital image in an efficient and effective manner. For example, the systems, computer-readable media, and the methods capture spatially varying material properties from a single digital image captured by a mobile camera. In particular, one or more embodiments utilize a deep-learning based framework that is designed to account for spatially varying material properties and interaction of light with materials. In one or more embodiments, the deep-learning based framework includes a neural network encoder, a neural network material classifier, and one or more neural network material property decoders. The neural network material classifier extracts a material classification of an object from a feature map produced by the neural network encoder. The deep-learning based framework then uses the neural network material property decoders to generate a material property set based on the extracted material classification and the feature map.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which:

FIG. 2A illustrates an overview of a process of utilizing a neural network encoder to generate a feature map from a digital image in accordance with one or more embodiments;

DETAILED DESCRIPTION

Figure 1:
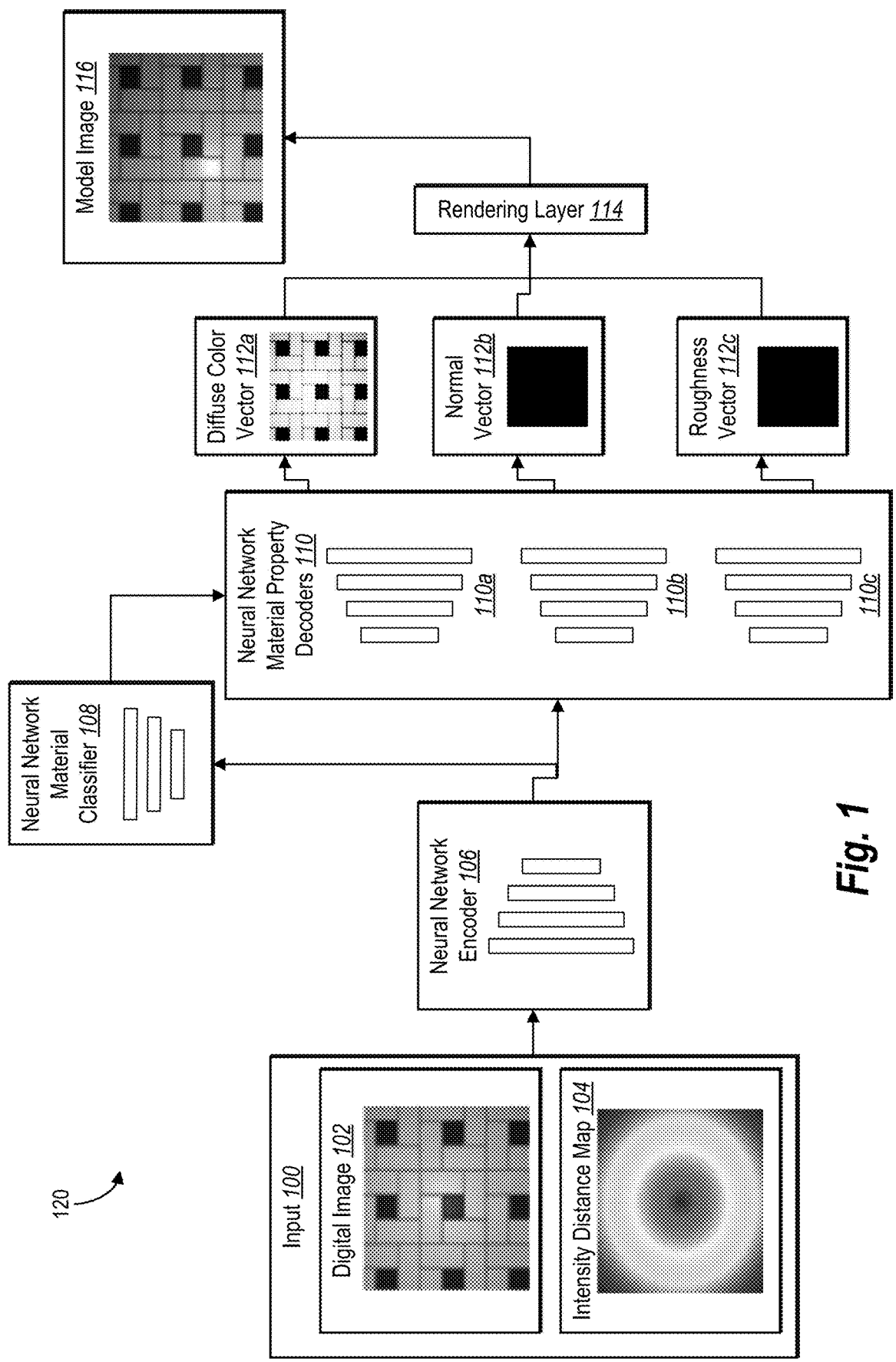
FIG. 1 illustrates an exemplary architecture of a digital image material property extraction system in accordance with one or more embodiments.

This disclosure describes one or more embodiments of a digital image material property extraction system that extracts material properties from a digital image. More specifically, the digital image material property extraction system recovers spatially-varying material properties from a single digital image. In particular, the digital image material property extraction system utilizes deep-learning to extract spatially varying material properties from a digital image. In one or more embodiments, the digital image material property extraction system includes a neural network encoder, a neural network material classifier, and one or more neural network material property decoders. The neural network encoder generates a latent representation (e.g., a feature map) of a digital image. The neural network material classifier generates a material classification from the feature map. The digital image material property extraction system uses the neural network material property decoders to generate a material property set based on the extracted material classification and the feature map.

As mentioned, many prior art material extraction methods require complex and expensive equipment. The digital image material property extraction system removes the requirement of expensive equipment, and thereby, increases the expands the availability and access to material extraction from images. This benefit is achieved, at least in part, by the framework of the digital image material property extraction system, which allows for extraction of spatially varying material properties from a single image captured on a device with a flash functionality (i.e., a single point light source). More specifically, the digital image material property extraction system is designed to extract material properties from a single image captured from readily available devices with flash illumination, such as for example, a camera of a mobile phone.

The digital image material property extraction system uses images under flash illumination as it is a relatively calibrated setting, which eases the burden on material estimation. Additionally, the digital image material property extraction system uses images captured under flash illumination to diminish shadows and allow for better observation of high-frequency specular highlights. Through the observation of high-frequency specular highlights, the digital image material property extraction system can accurately characterize materials and generate more accurate material property estimations. The use of images captured under flash illumination also allows the digital image material property extraction system to use post-processing techniques that require approximate calibration information.

The digital image material property extraction system receives an image captured under flash illumination as input. The digital image material property extraction system, using a neural network encoder, encodes the digital image into latent representation or feature map. The digital image material property extraction system, using one or more neural network material property decoders, decodes the feature map into spatially-varying material properties. In particular, the digital image material property extraction system decodes the feature map into spatially-varying bidirectional reflectance distribution function properties, namely surface normals, diffuse texture, and roughness (or specular) properties.

The distribution of bidirectional reflectance distribution function properties is closely related to surface material type. To account for this correspondence, some conventional system train separate networks for different material types. Such systems either have to include a large number of networks or be limited to a small number of material types. The digital image material property extraction system avoids such pitfalls by using a neural network material classifier that extracts a material classification from the feature map. The digital image material property extraction system evaluates the bidirectional reflectance distribution function properties for each material type and uses the classification results as weights to combine the predictions from different material types to obtain the final material properties.

The digital image material property extraction system, in one or more embodiments, further includes an in-network rendering layer. For instance, the digital image material property extraction system utilizes the rendering layer to combine the extracted material properties and a lighting environment to render a model image. The rendering layer provides an additional supervised learning opportunity and helps the digital image material property extraction system to generate material properties that effectively model appearances.

Furthermore, in some embodiments, the digital image material property extraction system utilizes post-processing methods to enhance the accuracy of the extracted material properties from the digital image. For instance, the digital image material property extraction system can utilize a densely connected continuous conditional random field to enhance the extracted material properties from the digital image.

By utilizing a neural network encoder, neural network material classifier, a plurality of material property decoders, and the rendering layer, the digital image material property extraction system can accurately extract material properties from a digital image portraying a material. Furthermore, as explained in greater detail below, the digital image material property extraction system jointly trains the various components of the framework in an end-to-end manner. By using a single network trained in an end-to-end manner, the digital image material property extraction system accurately extracts complex material properties from a digital image using less computational resources and training time compared to conventional systems that train separate networks for different material types.

As mentioned above, the digital image material property extraction system can accurately extract complex material properties from digital images without utilizing multiple images and/or without calibrated lighting and/or calibrated camera parameters. Indeed, the digital image material property extraction system, in some embodiments, utilizes a single input digital image from a mobile device. Thus, the digital image material property extraction system accurately extracts complex material properties from digital images more efficiently and with greater flexibility. Furthermore, as explained in greater detail below, the digital image material property extraction system can extract complex material properties with an increased accuracy compared to conventional systems despite using a single neural network, less computational resources, a single image, and image captured using cameras on off-the-shelf consumer mobile phones.

In addition to the foregoing, the digital image material property extraction system provides increased flexibility by allow for material property extraction from a single image at any point in time, including images not specifically captured with material extraction in mind.

Additional advantages and benefits of the digital image material property extraction system will become apparent in view of the following description. Further, as illustrated by the foregoing discussion, the present disclosure utilizes a variety of terms to describe features and advantages of the digital image material property extraction system. Before describing the digital image material property extraction system with reference to figures below, additional detail is now provided regarding the meaning of such terms.

The following terms are provided for reference. As used herein, the term "digital image" refers to any digital symbol, picture, icon, or illustration. For example, the term "digital image" includes digital files with the following, or other, file extensions: JPG, TIFF, BMP, PNG, RAW, or PDF. The term "digital image" also includes one or more images (e.g., frames) in a digital video. Additionally, the term "digital image" refers to 3D objects represented in a digital format. For example, the term "digital image" includes digital files with the following, or other, file extensions: OBJ, DAE, 3DS, U3D, and KMZ. Accordingly, although much of the description herein is phrased in terms of digital images, it will be appreciated that the disclosure can also apply to extracting properties from and/or editing digital video.

Moreover, as used herein, the term "object" (sometimes referred to as a "visual object") refers to a person, place, or thing portrayed in a digital image. For example, the term "object" includes a car that is portrayed in a digital image. Furthermore, the term "object" includes a car that is portrayed in a 3D model. It will be appreciated, however, that the term object can include any variety of other items, such as a human, an animal, or a structure.

Moreover, as used herein, the term "neural network" refers to a machine learning model that can be tuned (e.g., trained) based on inputs to approximate unknown functions. In particular, the term "neural network" can include a model of interconnected layers that communicate and analyze attributes at varying degrees of abstraction to learn to approximate complex functions and generate outputs based on a plurality of inputs provided to the model. For instance, the term "neural network" includes one or more machine learning algorithms. In particular, the term "neural network" includes deep convolutional neural networks (i.e., "CNNs") and fully convolutional neural networks (i.e., "FCNs"). In other words, a neural network includes an algorithm that implements deep learning techniques, i.e., machine learning that utilizes a set of algorithms to attempt to model high-level abstractions in data. Additional detail regarding exemplary neural networks and corresponding network architectures are provided below.

As used herein, the term "neural network encoder" or "encoder" refers to a set of lower neural network layers that generate feature maps based on inputs (e.g., a digital image). In particular, a neural network encoder applies an algorithm (or set of algorithms) to a digital image to determine features of that input. For example, a neural network encoder can include a deep convolutional neural network encoder.

Additionally, as used herein, the term "neural network decoder" or "decoder" refers to a set of higher neural network layers that process feature maps. In particular, a neural network decoder applies an algorithm (or set of algorithms) to a feature map to produce an output. For example, a neural network decoder can include a deep convolutional neural network decoder.

Additionally, as used herein, the term "feature map" refers to a set of numeric values representing characteristics and attributes of an image. In particular, the term feature map includes a set of values corresponding to latent and/or patent attributes and characteristics related to a digital image. In one or more embodiments, a feature map is a multi-dimensional dataset that represents image features. In the context of a digital image, a feature map includes data representing characteristics of the pixels of the digital image. In one or more embodiments, a feature map includes a set of numeric metrics learned by a machine learning algorithm.

As used herein, the term "rendering layer" refers to a portion of a neural network for generating a digital image based on physical properties. In particular, the term "rendering layer" includes one or more layers of a neural network for synthesizing physical properties to generate a digital image. In addition, the term "rendering layer" includes a portion of a neural network that models the image formation process based on intrinsic physical properties of a digital image. For example, a rendering layer can generate a digital image based on a material property set, a surface orientation map, and/or an illumination environment map.

As used herein, the term "material property set" (or "material properties") refers to a collection of properties corresponding to a material. In particular, the "material property set" can include a collection of properties (e.g., material parameters or material coefficients) that influence how light rays refract upon contacting a material. For example, a material property set can comprise a plurality of material properties, such as diffuse color, normals, and roughness.

Turning now to FIG. 1, an overview is provided of the digital image material property extraction system. After providing an overview, more detail regarding the components of the digital image material property extraction system will be provided in connection with FIGS. 2A-2D. Training of the digital image material property extraction system is then described in relation to FIGS. 3 and 4.

As shown in FIG. 1, the digital image material property extraction system 120 utilizes a neural network encoder 106, a neural network material classifier 108, one or more neural network material property decoders 110, and a rendering layer 114 in a split-merge neural network to extract material properties from an input 100. While the FIG. 1 shows the neural network material classifier 108 as part of the digital image material property extraction system 120, in one or more embodiments, the neural network material classifier 108 is optionally not included in the digital image material property extraction system 120, as explained below in relation to the experiment results.

As mentioned above, by utilizing a single neural network encoder 106 in conjunction with a neural network material classifier 108 and one or more neural network material property decoders 110, the digital image material property extraction system is capable of accurately extracting material properties of a material portrayed in a single digital image with less computational overhead. For instance, the digital image material property extraction system can accurately extract multiple material properties of a material portrayed in a digital image utilizing a single iteration of a neural network for all extracted material properties.

Indeed, as shown in FIG. 1, the digital image material property extraction system utilizes a digital image 102 which portrays a material and an intensity distance map 104. In one or more embodiments, the digital image material property extraction system utilizes a digital image 102 that is captured utilizing flash illumination on a mobile device. The digital image and the intensity distance map will be discussed in greater detail in FIGS. 2A and 5.

Additionally, as illustrated in FIG. 1, the digital image material property extraction system provides the digital image 102 and the intensity distance map 104 to a neural network encoder 106. In some embodiments, the neural network encoder 106 analyzes the digital image 102 and the intensity distance map 104 to generate a feature map. The neural network encoder will be discussed in greater detail in FIG. 2A. Furthermore, the digital image material property extraction system can provide the generated feature map to the neural network material classifier 108 and the one or more neural network material property decoders 110.

The digital image material property extraction system utilizes a neural network material classifier 108 to analyze the feature map to predict the material type of the material portrayed in digital image 102. In one or more embodiments, the neural network material classifier 108 provides the predicted material type(s) to the plurality of neural network material property decoders 110. By utilizing the neural network material classifier 108 in conjunction with the neural network material property decoders 110, the digital image material property extraction system can utilize material type predictions to influence the predicted material properties. The neural network material classifier 108 will be discussed in greater detail in FIGS. 2B and 2C.

Additionally, as shown in FIG. 1, the digital image material property extraction system utilizes one or more neural network material property decoders 110 to extract material properties. For example, the digital image material property extraction system can utilize the material classification vector generated from the neural network material classifier 108 and the feature map generated from the neural network encoder 106 to predict material properties from the material portrayed in digital image 102. In particular, as illustrated in FIG. 1, the digital image material property extraction system utilizes a neural network color diffuse decoder 110a to generate a diffuse color vector 112a. Likewise, the digital image material property extraction system utilizes a neural network normal decoder 110b to generate a normal vector 112b. Furthermore, the digital image material property extraction system utilizes a neural network roughness decoder 110c to generate a roughness vector 112c.

Furthermore, as shown in FIG. 1, the digital image material property extraction system utilizes a rendering layer 114 to render a model image 116 from a material property set (i.e., the combined output from the neural network material classifier 108 and the one or more neural network material property decoders 110). For instance, the rendering layer 114 can render a model image 116 that comprises the material properties predicted by the one or more neural network material property decoders 110. Indeed, in some embodiments, the generated model image 116 reflects a realistic appearance of the material portrayed in digital image 102. For example, the rendering layer 114 can render a model image 116 that comprises different specular and diffuse reflections of light based on a lighting environment. The rendering layer will be discussed in greater detail in FIG. 2D.

Figure 2B:
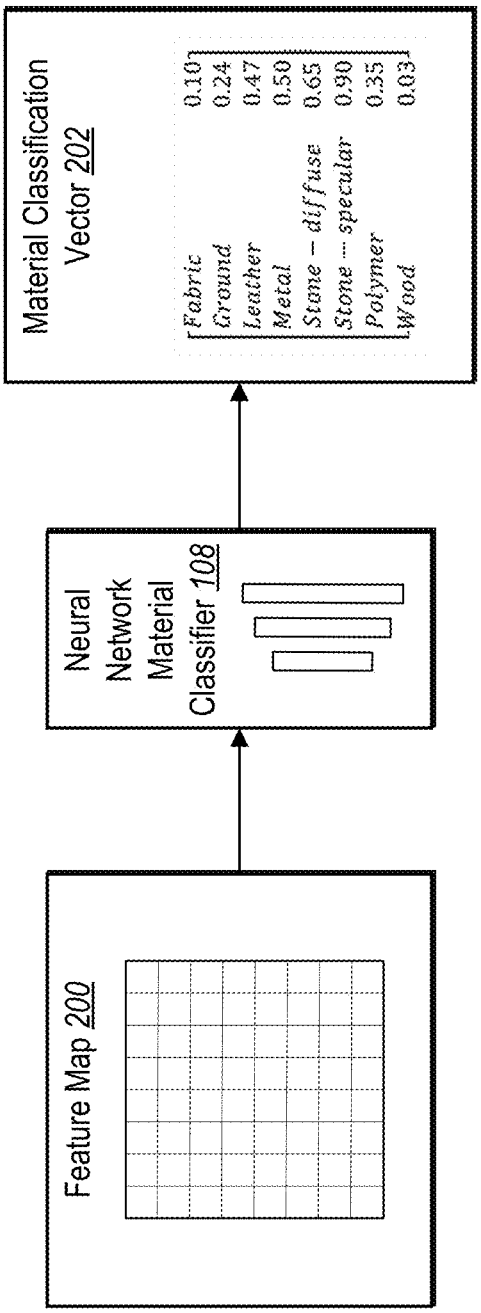
FIG. 2B illustrates an overview of a process of utilizing a neural network material classifier to generate a material classification vector in accordance with one or more embodiments.
Figure 2C:
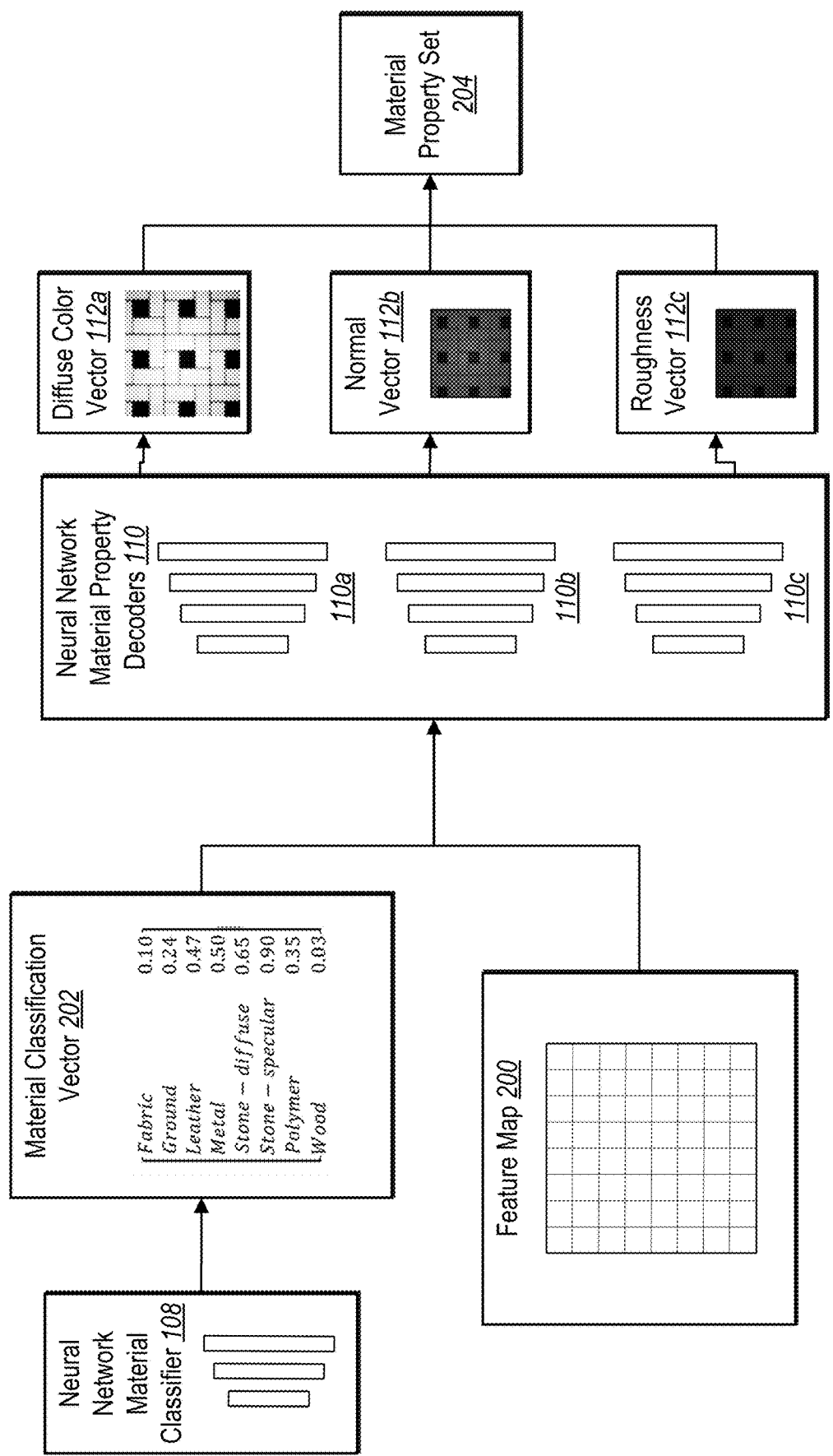
FIG. 2C illustrates an overview of a process of utilizing a material classification vector and one or more neural network material property decoders to generate a material property set in accordance with one or more embodiments.
Figure 2D:
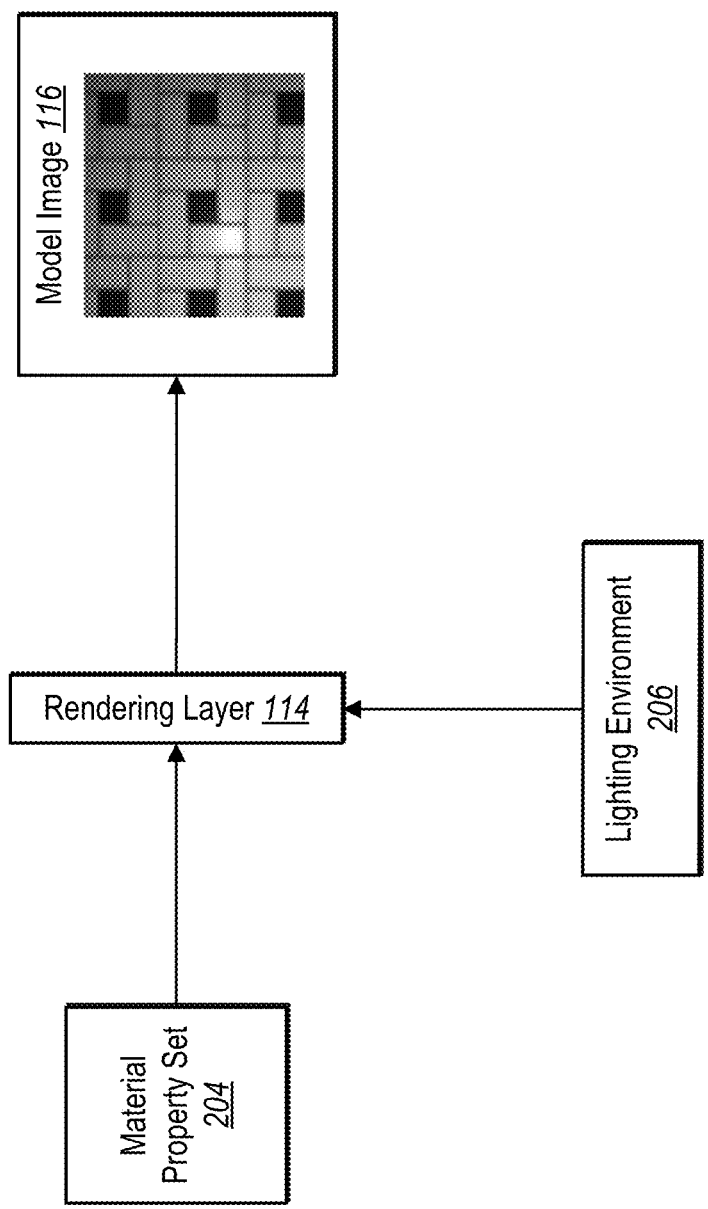
FIG. 2D illustrates an overview of a process of utilizing a rendering layer to generate a model image from a material property set in accordance with one or more embodiments.

More detail regarding the components of the digital image material property extraction system 120 will now be provided with reference to FIGS. 2A-2D. In particular, FIG. 2A illustrates the digital image material property extraction system 120 utilizing a neural network encoder 106 to generate a feature map. Moreover, FIG. 2B shows the digital image material property extraction system 120 utilizing the generated feature map and a neural network material classifier 108 to generate a material classification vector. Additionally, FIG. 2C illustrates the digital image material property extraction system 120 utilizing a material classification vector, feature maps, and one or more neural network material property decoders 110 to predict material properties from a material portrayed in the digital image 102. Furthermore, FIG. 2D illustrates the digital image material property extraction system 120 utilizing a generated material property set and a rendering layer 114 to render a model image.

As shown in FIG. 2A, the digital image material property extraction system 120 receives a digital image 102 as input 100. In some embodiments, the digital image 102 can be spatially variant. More specifically, the digital image 102 can comprise various material types and material properties at different pixels of the digital image 102. For example, the digital image 102 can be a digital image of, but is not limited to, wooden object, a metallic object, a plastic object, and/or a fabric-based object. In some embodiments, only a portion of the digital image 102 comprises a material. As illustrated in FIG. 2A, the digital image 102 can portray a stone tile material illuminated by a flash. Acquiring a digital image that comprises flash illumination will be described in greater detail in FIG. 5.

Moreover, as shown in FIG. 2A, input 100 also includes an intensity distance map 104. As used herein, the term "intensity distance map" refers to a digital representation of light intensities. In particular, the term "intensity distance map" refers to a digital representation of light intensities that are associated to corresponding locations of a digital image. For instance, the intensity distance map can comprise numerical values corresponding to light intensity values of a digital image 102.

As used herein, the term "light intensity value" refers to the amount of light on a digital image. In particular, the term "light intensity value" refers to the amount of light exposure that an area (i.e., pixels) of a digital image comprises. The light intensity value can include, but is not limited to, a numerical value, and/or RGB values corresponding to a specific amount of light (i.e., utilizing the RGB representation of the color blue where the light intensity value is high and utilizing the RGB representation of the color black where the light intensity value is low or 0).

As shown in FIG. 2A, the digital image 102 comprises a higher light intensity towards the center of the digital image 102. Thus, the intensity distance map 104 can comprise of a RGB values corresponding to a higher light intensity value towards the center. Likewise, the digital image material property extraction system 120 can associate other light intensity values of digital image 102 in the intensity distance map 104 by utilizing other RGB values corresponding to the different amounts of light intensity from the digital image 102. By utilizing the intensity distance map 104, the digital image material property extraction system 120 can train the neural network components to behave differently at different locations of the digital image 102.

Additionally, as illustrated in FIG. 2A, the digital image material property extraction system 120 provides the digital image 102 and the intensity distance map 104 to the neural network encoder 106 to generate one or more feature maps 200. In some embodiments, the neural network encoder 106 comprises a large receptive field to extract global information from entire digital images. For example, in some embodiments, the neural network encoder 106 comprises of seven convolutional layers of stride 2.

Moreover, as mentioned above, the neural network digital encoder 106 generates one or more feature maps 200. In some embodiments, the feature map 200 can be represented as matrices. After generating one or more feature maps 200 by utilizing the input 100 and the neural network encoder 106, the digital image material property extraction system can provide the one or more feature maps 200 to a neural network material classifier and one or more neural network material property decoders. For example, FIG. 2B illustrates the digital image material property extraction system providing the one or more feature maps 200 to a neural network material classifier 108 to generate a material classification vector 202. As used herein, the term "neural network material classifier" refers to a portion of a neural network for generating material classifications from feature maps of digital images. In particular, the term "neural network material classifier" refers to a neural network decoder that is trained as an image classifier that classifies digital image into one or more material types. In some embodiments, the neural network material classifier generates a material classification vector 202.

As used herein, the term "material classification vector" refers to output of a neural network material classifier. In particular, the term "material classification vector" refers to a set of digital information that represents the image classification outputs from a neural network material classifier for one or more material types. In some embodiments, the material classification vector can be represented as a vector of material types and material classification probabilities.

Furthermore, the term "material type" refers to a matter from which an object is fabricated. For example, in some embodiments, the material types can include, but are not limited to, matter such as fabric, ground (i.e., soil), leather, metal, stone-diffuse, stone-specular, polymer, and wood.

Additionally, as used herein, the term "material classification probabilities" refer to predictions output from the neural network material classifier 108 based on the feature maps of digital images. In particular, the term "material classification probabilities" refer to one or more determined probabilities that the object portrayed in a digital image represents one or more material types. For instance, the neural network material classifier 108 can predict from an input feature map 200, that an object within a digital image comprises a material type by generating a material classification probability for each material type known by the neural network material classifier. For example, in one or more embodiments, the neural network material classifier analyzes the feature map 200 of a digital image portraying a wooden fence and predicts that the digital image comprises a material type of metal with a material classification probability of 12 percent and a material type of wood with a material classification probability of 87 percent.

As shown in FIG. 2B, the digital image material property extraction system can utilize the neural network material classifier 108 to analyze the one or more feature maps 200 generated for the digital image 102 portraying stone tiles. Furthermore, as illustrated in FIG. 2B, the neural network material classifier 108 generates the material classification vector 202 after analyzing the one or more feature maps 200. Moreover, the material classification vector 202 comprises of eight material types (fabric, ground, leather, metal, stone-diffuse, stone-specular, polymer, and wood). Additionally, the material classification vector 202 comprises the predicted material classification probabilities for each of the material types. As shown in FIG. 2B, the digital image material property extraction system can determine that the material type portrayed in the digital image 102 is most likely a material type similar to stone-specular based on the predicted material classification probability of 90 percent by the neural network material classifier.

Moreover, in some embodiments, the digital image material property extraction system can utilize a neural network material classifier comprising a softmax layer. As used herein, the term "softmax layer" refers to an algorithm that can be used for categorical distributions. In particular, in some embodiments, the term "softmax layer" refers to a logistic regression that weighs multiple classifications into real values in the range of 0 to 1. In some embodiments, the softmax layer algorithm is used to emphasize larger values in a set of classification values and to understate classification values that are increasingly under the maximum classification value. For example, the digital image material property extraction system can utilize the softmax layer algorithm to emphasize the probability value of 0.9 for the diffuse-specular classification in material classification vector 202 while suppressing the value of 0.1 for the fabric classification.

Indeed, in some embodiments, the softmax layer algorithm can include a logistic function that weighs a K-dimensional vector z of material classification probabilities to a K-dimensional vector σ(z) of real values in the range [0, 1] that add up to 1. In particular, the softmax layer function can be represented as the following algorithm:

$$\sigma: \mathbb{R}^K \to [0, 1]^K$$

$$\sigma(z)_j = \frac{e^{z_j}}{\sum_{k=1}^{K} e^{z_k}} \text{ for } j = 1, \ldots, K.$$

Moreover, the digital image material property extraction system can utilize the softmax layer algorithm values generated by the softmax layer and the material classification vector as material type weights. As used herein, the term "material type weights" refer to one or more numerical values given to the material classification probabilities in a material classification vector generated by the neural network material classifier in order to emphasize or suppress one or more material classifications. For instance, in some embodiments, the digital image material property extraction system can determine a higher material type weight for material types with a high predicted material classification probability and a less significant material type weight for material types with a low predicted material classification probability. For instance, utilizing the above mentioned soft max layer function, the digital image material property extraction system can determine a material type weight of 0.278 for the material type stone-specular and a material type weight of 0.009 for the material type wood for the material classification vector 202. Furthermore, in one or more embodiments, the digital image material property extraction system can utilize the material type weights with one or more material properties to generate a material property set (discussed in greater detail, below, in FIG. 2C).

After generating the material classification vector 202, the digital image material property extraction system can provide the feature map and a material classification vector to one or more neural network material property decoders. For example, as illustrated in FIG. 2C, the digital image material property extraction system provides feature map 200 and material classification vector 202 to the plurality of neural network material property decoders 110 to predict one or more material properties from the material portrayed in digital image 102.

As used herein, the term "neural network material property decoder" refers to a portion of one or more neural networks for predicting/identifying material properties from feature maps of digital images. In particular, the term "neural network material property decoder" refers to one or more neural networks that are trained to identify bidirectional reflectance distribution function properties from a feature map of the digital image portraying a material. For instance, in some embodiments, the one or more neural network material property decoders generate one or more bidirectional reflectance distribution function parameter vectors. For example, as shown in FIG. 2C, the neural network material property decoders 110 include a neural network diffuse color decoder 110a, a neural network normal decoder 110b, and a neural network roughness decoder 110c.

As used herein, the term "bidirectional reflectance distribution function" (sometimes referred to as "BRDF") refers to a 4-D function that characterizes how a surface reflects lighting form an incident direction toward an outgoing direction. However, different bidirectional reflectance distribution functions can apply to different materials with different material properties. Accordingly, bidirectional reflectance distribution functions (i.e., "BRDFs") can be utilized to model a variety of different materials. Indeed, in one or more embodiments, the digital image material property extraction system can utilize a plurality of bidirectional reflectance distribution functions stored in data, for example, as a look up table, matrix, or database. Furthermore, in one or more embodiments, the digital image material property extraction system utilizes a microfacet parametric BRDF model to model a variety of different material properties and material types. In particular, a microfacet parametric BRDF model utilizes parameter values to model the ratio of the reflected radiance to the incident irradiance (sometimes referred to as "image light intensity") of a material given incoming and outgoing light directions for one or more portions of a digital image. Indeed, the microfacet parametric BRDF model can represent material properties that are isotropic and/or anisotropic.

In one or more embodiments, the digital image material property extraction system represents the parameters of the microfacet parametric BRDF model as the bidirectional reflectance distribution function parameters. As used herein, the term "bidirectional distribution function parameters" (sometimes referred to as "BRDF parameters") refers to one or more parameters utilized to model image light intensity for a material. In one or more embodiments, the BRDF parameters are spatially variant. For instance, in some embodiments, the BRDF parameters include a roughness parameter, a diffuse color parameter, and a normal parameter. For example, additional detail regarding microfacet parametric BRDF models is provided in B. Burley, PHYSI-CALLY-BASED SHADING AT DISNEY, ACM SIGGRAPH 2012 Courses (2012), which is incorporated herein by reference in its entirety.

The digital image material property extraction system defines a microfacet parametric BRDF model which provides a description of light reflections both for diffuse and specular surfaces (i.e., material surfaces). This BRDF model represents the intensity of light observed in a digital image as a function of diffuse color, normal, and roughness parameters. Indeed, the diffuse color, normal, and roughness values can be represented as $d_i$, $n_i$, and $r_i$, respectively at pixel i. Additionally, $v_i$ and $l_i$ are the view and light directions, respectively, and $h_i$ is the half angle vector at pixel i. Moreover, $I(d_i, n_i, r_i)$ represents the light intensity observed by a camera in a digital image. The microfacet parametric BRDF model function can be written as:

$$I(d_i, n_i, r_i) = d_i + \frac{D(h_i, r_i)F(v_i, h_i)G(l_i, v_i, h_i, r_i)}{4(n_i \cdot l_i)(n_i \cdot v_i)}$$

Given image intensity $I(d_i, n_i, r_i)$, the digital image material property extraction system, in some embodiments, can recover the parameters $d_i$, $n_i$, and $r_1$ for each pixel i in a digital image.

For example, as shown in FIG. 2C, the digital image material property extraction system utilizes a neural network diffuse color decoder 110a to predict a diffuse color vector 112a from the feature map 200 and material classification vector 202. As used herein, the term "neural network diffuse color decoder" (sometimes referred to as "diffuse color decoder") refers to a neural network material property decoder that analyzes digital images to predict diffuse color properties of a material portrayed in a digital image. Furthermore, the term "neural network diffuse color decoder" refers to a neural network material property decoder that analyzes one or more feature maps to predict diffuse color properties of a material portrayed in a digital image. Additionally, the neural network diffuse color decoder can output one or more diffuse color parameters and/or diffuse color vectors. In some embodiments, the neural network diffuse color decoder can utilize deep supervision to incorporate a multi-scale diffuse color vector.

Furthermore, as used herein, the term "diffuse color" (sometimes referred to as "diffuse color parameter", "albedo", "diffuse albedo", and/or "albedo parameter") refers to the characterization of the surface of a material based on the intrinsic color of the material. In particular, the term "diffuse color" refers to a characterization of the color of a material on a material surface when the material surface is devoid of shadows and/or reflected light. In some embodiments, the term "diffuse color" refers to the actual color of the material portrayed in a digital image.

In one or more embodiments, the diffuse color of a material can be represented in a diffuse color vector. As used herein, the term "diffuse color vector" refers to a digital representation of one or more diffuse color parameter values. For example, the diffuse color vector can include a numerical representation of a diffuse color at one or more pixels of a digital image. Indeed, a diffuse color vector can include a database, matrix, or image file that encodes three-dimensional color values represented by pixels in a digital image. In some embodiments, the diffuse color vector can include RGB values at one or more pixels of a digital image. Moreover, the diffuse color vector can include a mapping of diffuse color values for each pixel of a digital image.

Additionally, a mapping of diffuse color values, in some embodiments, resembles the input digital image without shadow and/or lighting effects on the color values for the pixels of the image.

In some embodiments, the diffuse color vector can comprise diffuse color probabilities. As used herein, the term "diffuse color probability" refers to a probability determined by the neural network diffuse color decoder for a diffuse color parameter corresponding to the actual diffuse color of a material portrayed in a digital image. For example, in some embodiments, the diffuse color probability can be represented as a percentage.

For example, as shown in FIG. 2C, the digital image material property extraction system utilizes the neural network diffuse color decoder 110a to analyze the feature map 200 to generate a diffuse color vector 112a, as a digital image mapping of diffuse color values for each pixel of the digital image 102. As illustrated in FIG. 2C, the diffuse color vector 112a comprises the material portrayed in digital image 102 without shadow and/or lighting effects. Thus, the diffuse color vector 112a comprises the predicted intrinsic color of the material portrayed in the digital image 102 by the neural network diffuse color decoder 110.

Additionally, as shown in FIG. 2C, the digital image material property extraction system utilizes a neural network normal decoder 110b to predict a normal vector 112b from the feature maps 200 and material classification vector 202. As used herein, the term "neural network normal decoder" (sometimes referred to as "normal decoder") refers to a neural network material property decoder that analyzes digital images to predict normal properties of a material portrayed in a digital image. Moreover, the term "neural network normal decoder" refers to a neural network material property decoder that analyzes one or more feature maps to predict normal properties of a material portrayed in a digital image. Additionally, the neural network normal decoder can output one or more normal parameters and/or normal vectors. In some embodiments, the neural network normal decoder can utilize deep supervision to incorporate a multi-scale normal vector.

As used herein, the term "normal" (sometimes referred to as a "normal parameter") refers to surface directions portrayed in a digital image. In particular, the normal parameter includes a digital representation of surface normal directions corresponding to a plane of a surface of a material portrayed in a digital image. Furthermore, a normal can be represented as an angle between the surface direction and the plane of a surface of a material. In some embodiments, the normal parameter can also be represented in a numerical form, a normal vector, and/or a set of three-dimensional coordinates. For example, on a material surface that is completely parallel to the corresponding plane of the material surface (i.e., a completely flat surface), the normal parameter can be represented as a 90-degree angle.

In one or more embodiments, the normal parameter of a material can be represented in a normal vector. As used herein, the term "normal vector" refers to a digital representation of one or more normal parameter values. For example, the normal vector can include a numerical representation of a normal parameter at one or more pixels of a digital image. For example, a normal vector can include a database, matrix, or image file that encodes normal values represented by pixels in a digital image. For example, a normal vector can include a database, matrix, or image file that encodes three-dimensional orientation of surface normal represented by pixels in a digital image. For example, the normal vector can comprise a three-channel normal parameter map. In particular, the normal vector can comprise an image file where the RGB color of each pixel encodes the x, y, and z dimensions of each surface normal direction corresponding to each pixel in a digital image.

For instance, as illustrated by FIG. 2C, the digital image material property extraction system utilizes the neural network normal decoder 110b to analyze the feature map 200 to generate a normal vector 112b, as a digital image mapping of normal values for each pixel of the digital image 102. As shown in FIG. 2C, the normal vector 112b comprises the material portrayed in digital image 102 in terms of the normal direction at each pixel in relation to a plane of the surface of the material portrayed in digital image 102. Furthermore, the normal vector 112b utilizes RGB color at each pixel to encode the predicted x, y, and z dimension of each normal direction corresponding to each pixel in the digital image 102.

Moreover, in some embodiments, the normal vector can comprise normal probabilities. As used herein, the term "normal probability" refers to a probability determined by the neural network normal decoder for a normal parameter corresponding to the actual normal direction of a material portrayed in a digital image. For example, in some embodiments, the normal probability can be represented as a percentage.

Additionally, as shown in FIG. 2C, the digital image material property extraction system utilizes a neural network roughness decoder 110c to predict a roughness vector 112c from the feature map 200 and material classification vector 202. As used herein, the term "neural network roughness decoder" (sometimes referred to as "roughness decoder") refers to a neural network material property decoder that analyzes digital images to predict roughness properties of a material portrayed in a digital image. Furthermore, the term "neural network roughness decoder" refers to a neural network material property decoder that analyzes one or more feature maps to predict roughness properties of a material portrayed in a digital image. In some embodiments, the neural network roughness decoder can utilize deep supervision to incorporate a multi-scale roughness vector. In one or more embodiments, the neural network roughness decoder can utilize the material classification vector to determine roughness properties of a material portrayed in a digital image. Additionally, the neural network roughness decoder can output one or more roughness parameters and/or roughness vectors.

As used herein, the term "roughness" (sometimes referred to as a "roughness parameter") refers to the characterization of the surface of a material based on features on the material surface that control the diffuse and specular response of a material. For instance, in some embodiments, a material surface characterized with a high roughness will appear flatter, grittier, dull, and/or without shine (i.e., matte-finished). Moreover, in some embodiments, a material surface characterized with a low roughness will appear shinier, smoother, reflective, brighter, and/or glossier. For example, a material surface such as wood can be characterized to comprise a high amount of roughness. To contrast, a material surface such as polished metal can be characterized to comprise a low amount of roughness.

In one or more embodiments, the roughness of a material can be represented in a roughness vector. As used herein, the term "roughness vector" refers to a digital representation of one or more roughness parameter values. For example, the roughness vector can include a numerical representation of the amount of roughness at one or more pixels of a digital image. Moreover, a roughness vector can include a database, matrix, or image file that encodes roughness parameter values represented by pixels in a digital image. In some embodiments, the roughness vector can include a mapping of roughness values for each pixel of a digital image. In some embodiments, the mapping of roughness values can comprise an RGB value for each pixel corresponding to a roughness value (i.e., darker gradients for higher amounts of roughness and lighter gradients for lesser amounts of roughness).

Moreover, in some embodiments, the roughness vector can comprise roughness probabilities. As used herein, the term "roughness probability" refers to a probability determined by the neural network roughness decoder for a roughness parameter corresponding to the actual roughness of a material portrayed in a digital image. For example, in some embodiments, the roughness probability can be represented as a percentage.

As illustrated in FIG. 2C, the digital image material property extraction system utilizes the neural network roughness decoder 110c to analyze the feature map 200 to generate a roughness vector 112c, as a digital image mapping of roughness values for each pixel of the digital image 102. As shown in FIG. 2C, the roughness vector 112c comprises the material portrayed in digital image 102 in terms of the roughness of the material at each pixel of the material portrayed in digital image 102. Furthermore, the roughness vector 112c utilizes RGB color (i.e., gradients of grey) at each pixel to encode the predicted roughness values corresponding to each pixel in the digital image 102.

In one or more embodiments, the digital image material property extraction system utilizes skip link layers (sometimes referred to as "skip links" or "skip connections") between one or more connections of the neural network components of the digital image material property extraction system. As used herein, the term "skip link connections" refers to a neural network layer that provides the output of a neural network layer to one or more non-adjacent neural network layers. For example, in one or more embodiments, the digital image material property extraction system utilizes skip connections to connect the neural network encoder and the one or more neural network material property decoders. Indeed, by providing skip connections between the neural network encoder and the one or more neural network material property decoders, the digital image material property extraction system can provide the generated feature maps and/or the information from one or more layers of the neural network encoder and/or the one or more neural network material property decoders while preserving details of the BRDF parameters.

Additionally, the one or more neural network material property decoders can predict BRDF parameters for one or more material types. In particular, the one or more neural network material property decoders can comprise an output channel for each material type available to the digital image material property extraction system. For example, the digital image material property extraction system can utilize the one or more neural network material property decoders to generate a separate BRDF parameter predictions for each material type such as fabric, ground, leather, metal, stone-diffuse, stone-specular, polymer, and wood. For instance, the output layers of one or more neural network material property decoders can each comprise K by N channels. For example, in some embodiments, the neural network diffuse color decoder can comprise three channels for each RGB color (i.e., N=3) and can also comprise the three RGB output channels for each material type (i.e., K=8 for the above-mentioned material types). Thus, in some embodiments, the neural network diffuse color decoder comprises of 24 output channels. Moreover, the diffuse color vector can comprise diffuse color predictions for the one or more material types (i.e., the 24 output channels). Similarly, the neural network normal decoder and the neural network roughness decoder can also comprise K by N channels, in which K is the number of material types and N is the number output channels for BRDF parameters (i.e., normal values or roughness values).

Moreover, the one or more neural network material property decoders can predict BRDF parameters specifically for the one or more material types. In particular, the one or more neural network material property decoders can utilize the material types to influence the predicted BRDF parameters for each material type. For instance, the neural network diffuse color decoder can predict separate diffuse color values for the material type of wood and the material type of metal. Similarly, the neural network normal decoder can predict separate normal values for each material type and the neural network roughness decoder can predict separate roughness values for each material type.

After generating the predicted BRDF parameters from the one or more neural network material property decoders and generating the predicted material types from the neural network material classifier, the digital image material property extraction system can also combine the predicted BRDF parameters and the predicted values from the neural network material classifier to determine a final set of predicted BRDF parameters. In particular, the digital image material property extraction system can combine the predicted BRDF parameters and the predicted values from the neural network material classifier by utilizing the material type weights from the softmax layer. For example, the digital image material property extraction system can combine the material type weights with the predicted BRDF parameters corresponding to the respective material type for the material type weights. In particular, in some embodiments, the digital image material property extraction system can multiply one or more BRDF parameters for a material type by a corresponding material type weight from a material classification vector.

For example, as shown in FIG. 2C and discussed above, the digital image material property extraction system can combine the values from the material classification vector 202 with the output from the one or more neural network material property decoders 110. For instance, as discussed above, the material classification vector 202 can comprise a material classification probability of 0.90 (i.e., 90 percent) and a material type weight from the softmax layer of 0.278 for the material type of stone-specular. In some embodiments, the digital image material property extraction system can multiply the output BRDF parameters for a material type of stone-specular from the one or more neural network material property decoders by the material type weight of 0.278 to generate weighted BRDF parameters for a material type of stone-specular. Likewise, the digital image material property extraction system can multiply the output BRDF parameters for the other material types from the one or more neural network material property decoders by the respective material type weights generated from the neural network material classifier to generate weighted BRDF parameters for the respective material types.

In addition to combining the values of the material classification vector and the BRDF parameters from the one or more neural network material property decoders, the digital image material property extraction system can also determine a final set of BRDF parameters (sometimes referred to as the "final BRDF reconstruction results"). In particular, the digital image material property extraction system can utilize the weighted BRDF parameters for the one or more material types to determine a final set of BRDF parameters. For example, in some embodiments, the digital image material property extraction system utilizes a combination of all of the weighted BRDF parameters output by the one or more neural network material property decoders for all of the material types to generate a final set of BRDF parameters. For instance, the digital image material property extraction system can utilize the summation of all of the weighted BRDF parameters for a specific type of BRDF parameter from the one or more neural network material property decoders. Similarly, the digital image material property extraction system can generate a final BRDF parameter for the other BRDF parameters of the one or more neural network material property decoders by utilizing the weighted BRDF parameters for each type of BRDF parameter to produce an averaged value for each type of BRDF parameter.

For example, as shown in FIG. 2C, the neural network diffuse color decoder 110a can generate a diffuse color vector 112a comprising predicted diffuse color values for each of the material types of fabric, ground, leather, metal, stone-diffuse, stone-specular, polymer, and wood. Furthermore, the digital image material property extraction system can combine the diffuse color values in diffuse color vector 112a with the respective material type weights generated for each of the material types of material classification vector 202 to generate weighted diffuse color values for each material type in diffuse color vector 112a. Additionally, the digital image material property extraction system can sum the weighted diffuse color values for each material type in diffuse color vector 112a as the final set of diffuse color values (i.e., a final set of BRDF parameters from the neural network diffuse color decoder 110a).

Similarly, the digital image material property extraction system can generate a final set of normal values from the normal vector 112b. For example, the neural network normal decoder 110b can generate a normal vector 112b comprising predicted normal values for each material type. Moreover, the digital image material property extraction system can generate weighted normal values by combining the normal values in the normal vector 112b with the respective material type weights from the material classification vector 202. Furthermore, the digital image material property extraction system can utilize a sum of the weighted normal values for each material type in normal vector 112b as the final set of normal values (i.e., a final set of BRDF parameters from the neural network normal decoder 110b).

Additionally, the digital image material property extraction system can generate a final set of roughness values from the roughness vector 112c. Indeed, the neural network roughness decoder 110c can generate a roughness vector 112c comprising predicted roughness values for each material type. Moreover, the digital image material property extraction system can generate weighted roughness values by combining the roughness values in the roughness vector 112c with the respective material type weights from the material classification vector 202. Furthermore, the digital image material property extraction system can utilize the sum of the weighted roughness values for each material type in roughness vector 112c as the final set of roughness values (i.e., a final set of BRDF parameters from the neural network roughness decoder 110c).

Moreover, the digital image material property extraction system can utilize the BRDF parameter vectors 112 and the material classification vector 202 to generate a material property set 204. In some embodiments, the digital image material property extraction system combines the one or more final BRDF parameters (i.e., the average weighted BRDF parameters) from the BRDF parameter vectors 112 and a determined material type for the material portrayed in the input digital image from the material classification vector 202 to generate the material property set 204.

As used herein, the term "material property set" refers to a collection of properties corresponding to a material. In particular, the "material property set" can include a collection of properties (e.g., BRDF parameters, material coefficients, or material types) that influence how light rays refract upon contacting a material. For example, a material property set can comprise a plurality of material parameters, such as shadow-casting, multiple scattering, mutual shadowing, transmission, reflection, absorption, emission by surface elements, facet orientation distribution, and facet density. Additionally, a material property set can comprise one or more BRDF parameters and a material type. For example, the material property set can comprise a material type, a diffuse color vector, a normal vector, and a roughness vector. For instance, as discussed above, the digital image material property extraction system can utilize the final set of diffuse color values, final set of normal values, and the final set of roughness values from the weighted BRDF parameters in the material property set 204.

Additionally, the digital image material property extraction system can determine a material type from the material classification vector for the material property set 204. In particular, the digital image material property extraction system can determine the most likely material type based on the generated material classification probabilities by the neural network material classifier (as discussed above in FIG. 2B). In one or more embodiments, the digital image material property extraction system utilizes the determined material type in the final material property set 204.

As mentioned above, the digital image material property extraction system can utilize a material property set generated from the neural network encoder, the neural network material classifier, and the one or more neural network material property decoders to render a model image. For example, FIG. 2D illustrates the digital image material property extraction system utilizing a material property set 204 and a rendering layer 114 and a lighting environment 206 to render a model image 116. For instance, the digital image material property extraction system provides the material property set 204 to the rendering layer 114. Moreover, the rendering layer 114 uses the material property set 204 and a lighting environment 206 to render a model image 116 that comprises the material properties of the material portrayed in digital image 102.

As used herein, the term "lighting environment" (sometimes referred to as "illumination environment") refers to lighting within a space. In particular, the term "lighting environment" refers to a representation of lighting within a three-dimensional space that makes one or more objects visible to a camera. For example, the lighting environment can include a type of lighting such as, but not limited to, sunlight, LED light, and halogen lights. Furthermore, the lighting environment can also include the direction and/or angle of lighting. Moreover, the lighting environment can include an illumination environment map. As used herein, the term "illumination environment map" refers to a digital representation of a lighting environment. In particular, the term "illumination environment map" includes a representation of light ray directions corresponding to a digital image. For example, in one or more embodiments, an illumination environment map includes a representation of incoming light ray directions and other lighting environment features corresponding to pixels (or pixel coordinates) of a digital image.

As used herein, the term "model image" refers to a digital image and/or an object that comprises one or more material properties. In particular, the term "model image" refers to a digital image and/or an object that comprises one or more material properties such as BRDF parameters, a material type, or other properties to represent a realistic appearance model of a material in one or more lighting environments. For example, a model image can comprise of an object and/or digital image that comprises of a synthesized material texture and one or more material properties so that the object and/or digital image reflects light from different lighting environments according to a realistic appearance model.

Additionally, as used herein, the term "realistic appearance model" refers to a set of material properties that demonstrate the specular properties, diffuse properties, and other material properties for an object or digital image that comprises the material properties. In some embodiments, the realistic appearance model reflects the diffuse, specular, and other material properties in one or more lighting environments based on the predicted BRDF parameters and predicted material type by the digital image material property extraction system.

As used herein, the term "diffuse property" refers to a property of a material having a rough surface that reflects light in many different directions. In particular, the term "diffuse property" includes a property of a material that reflects light such that the apparent brightness is the same regardless of an observer's angle of view. For example, diffuse properties include the properties of materials such as unfinished wood, concrete, brick or woolen clothing. The term "specular property" refers to a property of a material having a smooth surface that reflects light in the same direction. The term "specular property" includes a property of a material that reflects light such that brightness changes based on an observer's angle of view. For instance, a specular property of a material reflects light such that a spot of light appears on the object when illuminated (i.e., a spot of light that changes position based on an observer's angle of view). Specular property includes properties of materials such as finished wood, a mirror, or polished metal.

As shown in FIG. 2D, the rendering layer 114 utilizes the material property set 204 and the lighting environment 224 to generate model image 116. For instance, the rendering layer 114 utilizes a lighting environment and the material property set 204 to render a model image 116 that comprises the predicted material based on the material portrayed in digital image 102. As shown in FIG. 2D, the rendering layer 114 provides a lighting environment 224 that provides lighting to an off-center portion of the model image 116 (compared to the digital image 102 which comprises a lighting environment that provides lighting to the center portion of the digital image 102). Furthermore, the rendering layer 114 constructs the BRDF parameters and material properties of the model image to reflect the new lighting environment 224 as a realistic appearance model of the material portrayed in digital image 102. As a result, the model image 116 can accurately reflect light in comparison to the actual material portrayed in the digital image 102 under the same lighting environment.

Additionally, the digital image material property extraction system can provide the rendering layer 114 with more than one lighting environments. For example, the digital image material property extraction system can provide the lighting environments for multiple directions of a real-world environment. In one or more embodiments, the rendering layer can utilize the material property set 204 and the multiple lighting environments to render one or more model images that reflect light accurately in association with the multiple lighting environments. In some embodiments, the rendering layer 114 can generate a model image as a comprehensive realistic appearance model that comprises properties for all of the provided lighting environments. Moreover, in some embodiments, the rendering layer 114 can generate a separate model image for each lighting environment.

Additionally, the digital image material property extraction system can utilize the rendering layer 114 to generate visual objects (such as 3D objects) that comprise a realistic appearance model based on the material property set 204 and one or more lighting environments. Generating visual objects that comprise realistic appearance models are discussed in greater detail in FIG. 6 below.

Acts 100-116 of FIG. 1, acts 200-224 of FIG. 2, and the algorithms presented above in relation to FIGS. 1 and 2 can comprise the corresponding structure for performing a step for utilizing the neural network encoder, the neural network material classifier, and the plurality of neural network decoders to generate the material property set from the digital image.

Figure 3:
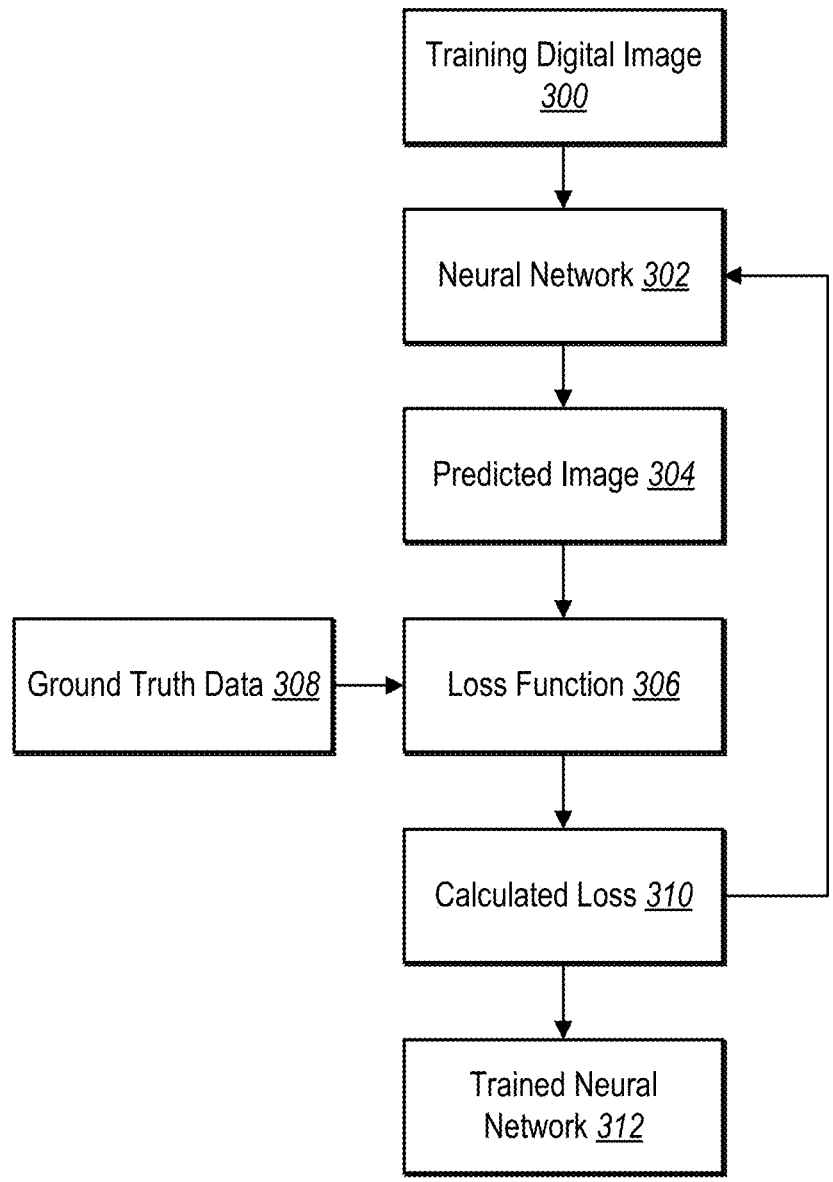
FIG. 3 illustrates an overview of a process of training a neural network of a digital image material property extraction system in accordance with one or more embodiments.

The digital image material property extraction system can train a neural network to accurately capture material properties from a single digital image. For example, FIG. 3 illustrates the digital image material property extraction system generating a trained neural network in accordance with one or more embodiments. In particular, in relation to FIG. 3, the digital image material property extraction system utilizes the training digital image 300, the predicted model image 304, and the loss function 306 to train the neural network 302 to generate the trained neural network 312.

FIG. 3 illustrates the neural network 302 as all of the components of the digital image material property extraction system. However, the digital image material property extraction system can train each component of the digital image material property extraction system (i.e., the neural network encoder, the neural network material classifier, the one or more neural network material property decoders, and the rendering layer) with specific ground truth data for each component and specific predicted values for each component in one iteration.

More specifically, as shown in FIG. 3, the digital image material property extraction system obtains and/or identifies training digital images from a training dataset. The training dataset can comprise any group or collection of digital images. For instance, in one or more embodiments, the training dataset comprises a set of digital images. For example, in one or more embodiments, the training dataset comprises the Adobe Stock 3D Material Dataset. In particular, the Adobe Stock 3D Material Dataset contains digital images of materials with high resolution spatially variant BRDF parameters.

In relation to FIG. 3, the training digital image 300 also correspond to the ground truth data 308. In particular, the training digital image 300 includes a ground truth data 308 for the training digital image 300, where the ground truth data 308 defines the BRDF parameters and material types for each pixel of the training digital image 300. For example, the training digital image 300 can include the ground truth data 308, where the ground truth data 308 accurately defines the BRDF parameters, material types, and material properties for each pixel of the training digital image 300. Moreover, the digital image material property extraction system can utilize more than one training digital image 300 and more than one ground truth data 308 corresponding to each training digital image to train the neural network.

As used herein, the term "ground truth data" includes information of a known set of pixels reflecting a known set of properties for a digital image. For example, a ground truth data can include information pre-determined from a digital image as information that accurately comprises the properties of the digital image. Additionally, the ground truth data 308 can comprise of a ground truth material property set and a ground truth model image.

As used herein, the term "ground truth material property set" refers to information of a known set of pixels reflecting a known set of material properties for the pixels of a digital image portraying a material. For example, a ground truth material property set can include information pre-determined from a digital image as information that accurately comprises the material properties (such as the material type and the BRDF parameters) of the digital image at each pixel. Additionally, as used herein, the term "ground truth model image" refers to information of a known set of pixels reflecting a known rendering of a set of material properties under a lighting environment for material portrayed in a digital image. For example, a ground truth model image can include information pre-determined from a digital image as information that accurately comprises the rendering of a set of material properties and a material type (i.e., in a realistic appearance model) under one or more lighting environments of the material portrayed in a digital image at each pixel.

Moreover, as shown in FIG. 3, the digital image material property extraction system utilizes the training digital image 300 to train the neural network 302. In particular, the digital image material property extraction system can utilize the neural network 302 to predict feature maps, material classification vectors, one or more BRDF parameter vectors, and/or rendered model images (as the predicted image 304) from the training digital image 300 (as discussed above in FIGS. 2A-2D). Specifically, as illustrated in FIG. 3, the digital image material property extraction system utilizes the neural network 302 to generate the predicted image 304 comprising a predicted material property set and a predicted model image of the training digital image 300.

In one or more embodiments, the neural network 302 utilizes the training digital image 300 and the predicted image 306 to learn to accurately capture material properties from a single digital image. In particular, the digital image material property extraction system compares the predicted image 304 with the ground truth data 308, which comprises the ground truth material property set and a ground truth model image. For instance, as illustrated in FIG. 3, the digital image material property extraction system compares the predicted image 304 and the ground truth data 308 utilizing a loss function 306 that generates a calculated loss 310. Specifically, the loss function 306 can determine a difference between the ground truth data 308 and the predicted image 304 (e.g., material type of the training digital image 300 improperly identified as wood relative to the ground truth data 308 comprising a material type of metal).

Further, as shown in FIG. 3, the neural network 302 then utilizes the calculated loss 310 to learn to more accurately predict material properties and/or render model images. Specifically, the digital image material property extraction system utilizes the calculated loss 310 and provides this information to the neural network 302 in order to adjust the parameters of the neural network 302. For example, the digital image material property extraction system can back propagate the calculated loss 310 to the components of the digital image material property extraction system (illustrated as neural network 302). In particular, the digital image material property extraction system can modify neural network parameters of the neural network 302 to minimize the calculated loss 310 and predict material properties and/or render model images that better reflect the ground truth. In one or more embodiments, the digital image material property extraction system repeatedly generates predicted image 304 and modifies neural network parameters of the neural network 302 to generate the trained neural network 312.

In one or more embodiments, the digital image material property extraction system utilizes a calculated loss that comprises a specific loss for each component of the digital image material property extraction system. For example, the calculated loss can comprise a material classifier loss, a material property decoder loss, and a rendering layer loss. The calculated loss and back propagating the calculated loss is described in greater detail below in FIG. 4.

Additionally, as used herein, the term "neural network parameters" can include a plurality of parameters that are utilized by the neural network. In particular, in one or more embodiments, neural network parameters include parameters that are utilized by the digital image material property extraction system to train the neural network components (i.e., the neural network encoder, the neural network material classifier, the one or more neural network material property decoders, and the rendering layer). The neural network parameters can include any kind of data for the training the neural network components of the digital image material property extraction system to accurately capture material properties and/or render model images. Specifically, in one or more embodiments, the neural network parameters include optimization parameters such as neural network initialization parameters, weight decay parameters, and/or iteration parameters.

As just mentioned, the digital image material property extraction system can utilize ground truth data and calculated losses to train the neural network encoder, the neural network material classifier, the one or more neural network material property decoders, and the rendering layer to accurately capture material properties from a digital image. For example, FIG. 4 illustrates the digital image material property extraction system utilizing a material classifier loss, a material property decoder loss, and a rendering layer loss to train the components of the digital image material property extraction system.

Figure 4:
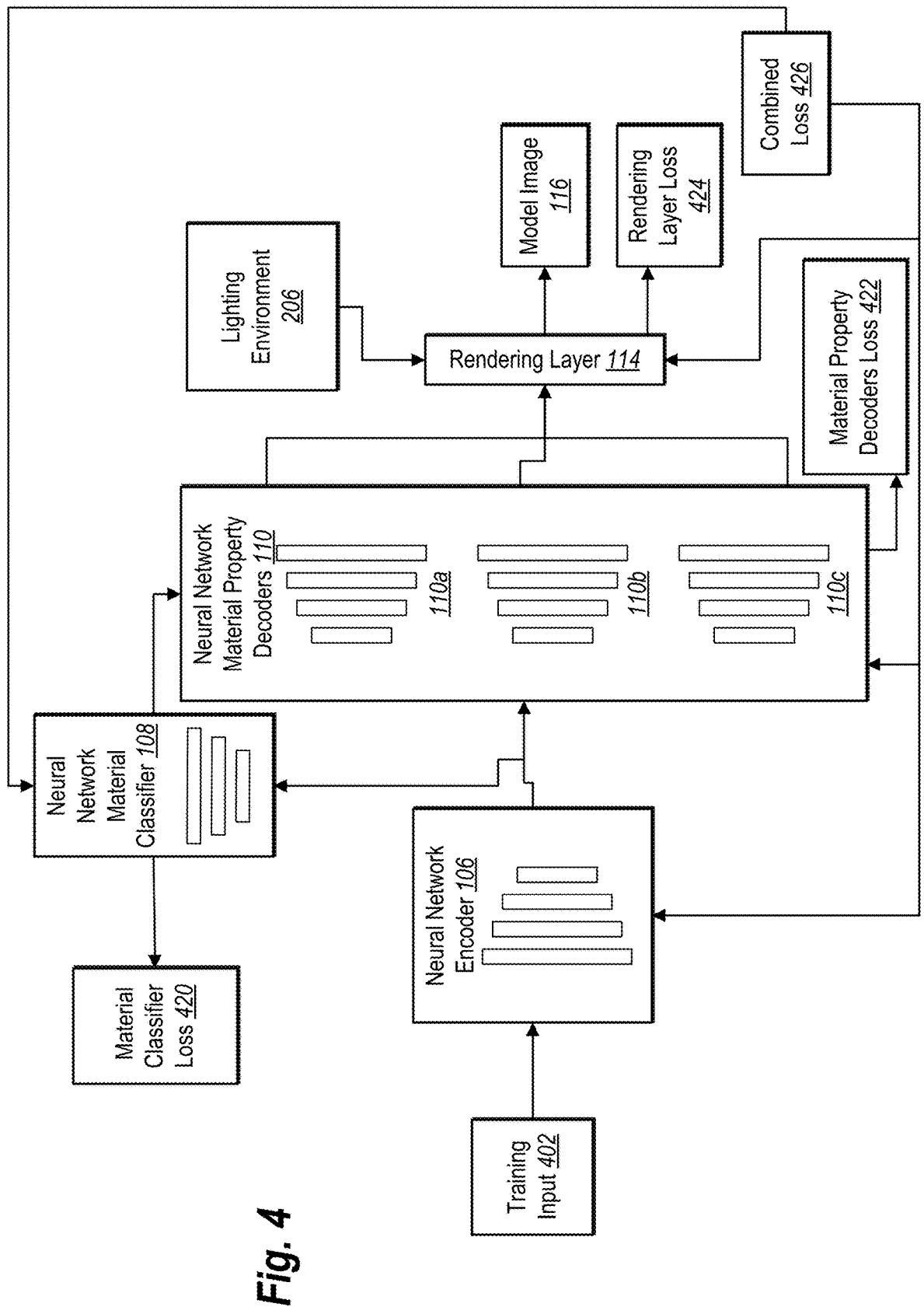
FIG. 4 illustrates a detailed process of jointly training a neural network encoder, a neural network material classifier, one or more neural network material property decoders, and a rendering layer of a digital image material property extraction system in accordance with one or more embodiments.

As shown in FIG. 4, the digital image material property extraction system can utilize training input to train the components of the digital image material property extraction system in accordance to the description in FIG. 3. For example, the digital image material property extraction system provides training input 402 (i.e., one or more training digital images) to the neural network encoder 106, the neural network material property decoders 110, the neural network material classifier 108, and the rendering layer 114. Additionally, these components of the digital image material property extraction system analyze the training digital image from input in accordance with FIGS. 1 and 2.

Indeed, the digital image material property extraction system can provide the training input to the neural network encoder 106 to generate a feature map. The digital image material property extraction system the provides the feature map to the neural network material property decoders 110, which generate predicted material properties as described above. The digital image material property extraction system can compare the one or more predicted material properties from the one or more neural network material property decoders 110 with ground truth data (i.e., a ground truth material property sets to generate a material property decoder loss 422. More specifically, the material property loss 422 can comprise the difference between the ground truth data of training input 402 and the predicted one or more BRDF reconstructions from the neural network material property set decoders 110. In some embodiments, the material property decoder losses 422 can comprise a L2 loss.

In particular, the material property decoder loss 422 can comprise of a plurality of individual material property decoder 110 losses. For example, the material property decoder loss 422 can comprise of a diffuse color decoder loss, a normal decoder loss, and a roughness decoder loss.

For instance, the neural network diffuse color decoder can generate a predicted diffuse color value(s) and generate a diffuse color decoder loss by comparing the predicted diffuse color value(s) with the corresponding ground truth value(s). In some embodiments, the neural network diffuse color decoder loss can be represented as $\mathcal{L}_d$.

Moreover, the neural network normal decoder can generate a predicted normal value(s) and generate a normal decoder loss. More specifically, the digital image material property extraction system can compare the predicted normal value(s) from the neural network normal decoder with ground truth data (i.e., ground truth material property sets) to generate a normal decoder loss. In one or more embodiments, the normal decoder loss can be represented as $\mathcal{L}_n$.

Additionally, the neural network roughness decoder can generate a predicted roughness value(s) and generate a roughness decoder loss. In particular, the digital image material property extraction system can compare the predicted roughness value(s) from the neural network roughness decoder with ground truth data (i.e., ground truth material property sets) to generate a roughness decoder loss. In some embodiments, the neural network roughness decoder loss can be represented as $\mathcal{L}_r$.

The digital image material property extraction system can also utilize the neural network material classifier 108 to generate a material classifier loss for training purposes. For example, as shown in FIG. 4, the neural network material classifier 108 can analyze the output from the neural network encoder 106 to generate a material classification vector and a material classifier loss 420. In particular, the digital image material property extraction system can compare the predicted material classification vector from the neural network material classifier 108 with ground truth data (i.e., the ground truth material property set) to generate a material classifier loss 420. More specifically, the material classifier loss 420 can comprise the difference between the ground truth data of training input 402 and the predicted material classification vector from the neural network material classifier 108. In some embodiments, the material classifier loss 420 comprises of a cross entropy classification loss and is represented as $\mathcal{L}_{cls}$.

Furthermore, the digital image material property extraction system can also utilize a rendering layer to generate a rendering layer loss for training purposes. For example, as shown in FIG. 4, the rendering layer 114 can analyze the training input 402, the output of the neural network encoder 106, the output of the one or more neural network material property decoders 110, and/or the output of neural network material classifier 108 to generate a model image 116 and a rendering layer loss 424. In particular, the digital image material property extraction system can compare the predicted model image 116 from the rendering layer 114 with ground truth data (i.e., the ground truth model image) to generate a rendering layer loss 424. In particular, the rendering layer loss 424 can comprise the difference between the ground truth data of training input 402 and the predicted model image 116 from the rendering layer 114. In some embodiments, the rendering layer loss 424 comprises of a L2 loss and is represented as $\mathcal{L}_{rec}$.

In one or more embodiments, the rendering layer loss can comprise a calculated loss for more than one model image for more than one lighting environment. For example, in some embodiments, the digital image material property extraction system utilizes the rendering layer 114 with more than one lighting environments to generate multiple model images 116 (as discussed in FIG. 2D). The digital image material property extraction system can compare the one or more predicted model images 116 from the rendering layer 114 for the one or more lighting environments with ground truth data (i.e., the ground truth model images) for the corresponding lighting environments to generate a set of rendering layer losses 424. In particular, the set of rendering layer loss 424 can comprise the difference between the ground truth data of training input 402 for each lighting environment and the predicted model images 116 from the rendering layer 114 for each corresponding lighting environment. Additionally, the set of rendering layer losses 424 comprise of L2 losses and can be collectively represented as $\mathcal{L}_{rec}$.

Furthermore, in some embodiments, the digital image material property extraction system can combine the calculated losses from the components of the digital image material property extraction system. For example, the digital image material property extraction system can combine the material classifier loss 420, the one or more material property decoder losses 422, and the rendering layer loss 424 to generate a combined loss 426. Indeed, in some embodiments, the combined loss 426 can be represented as:

$$\mathcal{L} = \mathcal{L}_d + \mathcal{L}_n + \mathcal{L}_r + \mathcal{L}_{cls} + \mathcal{L}_{rec}$$

Additionally, in some embodiments, the digital image material property extraction system can utilize weights for the calculated losses of the components of the digital image material property extraction system. Indeed, in some embodiments, the combined loss 426 can be represented as:

$$\mathcal{L} = \lambda_d \mathcal{L}_d + \lambda_n \mathcal{L}_n + \lambda_r \mathcal{L}_r + \lambda_{cls} \mathcal{L}_{cls} + \lambda_{rec} \mathcal{L}_{rec}$$

For example, $\lambda_d$ represents a weight for the diffuse color decoder loss, $\lambda_n$ represents a weight for the normal decoder loss, and $\lambda_r$ represents a weight for the roughness decoder loss. Additionally, $\lambda_{cls}$ represents a weight for the material classification loss and $\lambda_{rec}$ represents a weight for the rendering layer loss. In some embodiments, the weights for the calculated losses are positive coefficients balancing the contribution of different terms. For example, in some embodiments, the weights for the calculated losses can be inversely proportional to the number of available ground truth data for each component of the digital image material property extraction system. For example, $\lambda_{cls}$ can be inversely proportional to the number of ground truth material types available from the training digital images for a particular type of material type in order to balance different material types in the loss function.

Additionally, $\lambda_n$ (sometimes referred to as "normal weight") can be inversely proportional to a normal distribution percentage. In particular, the digital image material property extraction system can assign weights to the normal values from the neural network normal decoder.

For example, in some embodiments, the digital image material property extraction system can generate normal distribution percentages for one or more normal values based on one or more groupings for the normal values. As used herein, the term "grouping" refers to a data set, collection, bins, or group of values. Furthermore, in one or more embodiments, the digital image material property extraction system can generate groupings based on one or more angle ranges. As used herein, the term "angle range" refers to a range of angle values. For example, an angle range can comprise of the angles between 0 and 15 degrees or 15 and 90 degrees. As mentioned above, the normal values can be represented as angles (sometimes referred to as "normal angles").

In some embodiments, the digital image material property extraction system can group one or more normal angles into groupings. For example, the digital image material property extraction system can comprise three groupings of angle ranges 0 to 10 degrees, 10 to 25 degrees, and 25 to 90 degrees. Additionally, the digital image material property extraction system can group the normal angles from the normal vector into the corresponding grouping based on the normal angles. For example, the digital image material property extraction system can group a predicted normal angle of 15 degrees into the grouping for the angle range 10 to 25 degrees.

Additionally, the digital image material property extraction system can utilize the groupings and to generate a normal distribution percentage for each of the groupings. For example, the digital image material property extraction system can determine the number of normal angles from a normal vector associated with each grouping. Furthermore, the digital image material property extraction system can generate a total sum of the number of normal angles from the normal vector. In some embodiments, digital image material property extraction system can divide the number of normal angles associated with each grouping by the total number of normal angles from the normal vector to generate a normal distribution percentage for each grouping.

Indeed, the digital image material property extraction system can generate a normal weight that is inversely proportional to the normal distribution percentage associated with a normal angle prediction. For example, the normal weight can be represented as:

$$W_i = 0.7 + \left(\frac{1}{10}\right) \times P_i$$

where $P_i$ is the normal distribution percentage for grouping i. By generating a normal weight that is inversely proportional to a normal distribution percentage associated with a normal angle, the digital image material property extraction system can prevent the network from over-smoothing the normal values when a majority of normal directions on the plane of a surface are flat.

Additionally, the digital image material property extraction system can utilize the combined loss to train the components of the digital image material property extraction system to accurately capture material properties from a single image. For example, as shown in FIG. 4, the digital image material property extraction system back propagates the combined loss 426 to the neural network encoder 106, the one or more neural network material property decoders 110, the neural network material classifier 108, and the rendering layer 114. In some embodiments, the digital image material property extraction system adjusts neural network parameters of the neural network encoder 106, the one or more neural network material property decoders 110, the neural network material classifier 108, and the rendering layer 114 based on the combined loss 426. As discussed in FIG. 3, the digital image material property extraction system can repeatedly provide the training data and ground truth data to generate a combined loss from the components of the digital image material property extraction system, for multiple iterations, until a threshold accuracy for material capture is achieved by the digital image material property extraction system.

Acts 300-312 from FIG. 3, acts 402-426 from FIG. 4, and the algorithms presented above in relation to acts from FIGS. 3 and 4 can comprise the corresponding structure for performing a step for training a neural network encoder, a neural network material classifier, and a plurality of neural network decoders to generate a material property set from a digital image comprising flash illumination.

Figure 5:
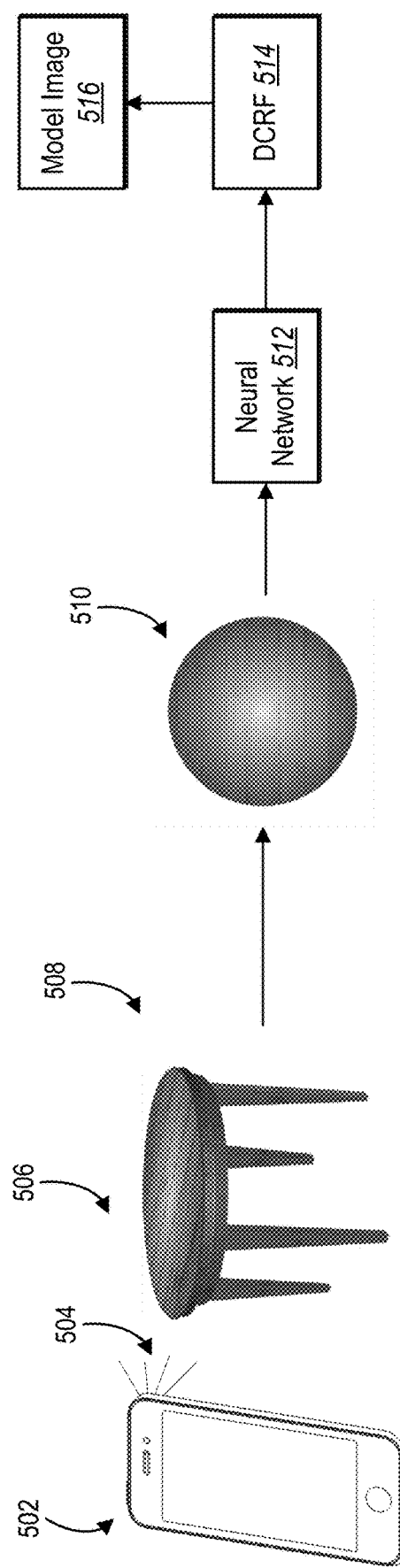
FIG. 5 illustrates an overview of a process of capturing a digital image using flash illumination, extracting material properties from the digital image, and utilizing a post-processing method to apply the extracted material properties to another digital image in accordance with one or more embodiments.

As mentioned above, the digital image material property extraction system utilizes digital images comprising flash illumination. Furthermore, the digital image material property extraction system can utilize post processing methods to further enhance the accuracy of the material properties captured from materials portrayed in a digital image. For example, FIG. 5 illustrates the digital image material property extraction system utilizing a digital image, captured by a mobile device with flash illumination, with the neural network components of the digital image material property extraction system and a densely connected continuous conditional random field to generate a model image that accurately portrays material properties captured from a digital image.

For example, the digital image material property extraction system can utilize a digital image comprising flash illumination. As shown in FIG. 5, digital image material property extraction system utilizes a digital image 510 captured by a mobile device 502 utilizing flash illumination 504. For instance, the mobile device 502 utilizes flash illumination 504 to capture a digital image 510 of a wood surface 506. Thus, the captured digital image 510 portrays a material of wood from the wood surface 506 with a concentrated light intensity (due to the flash illumination).

As used herein, the term "flash illumination" refers to a type of illumination utilizing a camera flash device. In particular, the term "flash illumination" refers to a light caused by a single point light source such as a camera flash device. For example, in some embodiments, digital image comprising flash illumination can include a digital image taken utilizing a mobile device with the flash option enabled in the mobile device. In one or more embodiments, flash illumination causes a concentrated light intensity in a digital image.

Furthermore, as used herein, the term "single point light source" refers to a light source that originates from a single point. In particular, the term "single point light source" refers to a light source in which the majority of light from the light source travels in similar direction. In some embodiments, the single point light source can include, but is not limited to, a singular light device (i.e., an LED) that directs light to a specific target (i.e., the center of a table top) instead of providing an ambient light (i.e., lighting an entire room). In some embodiments, the single point light source can comprise of multiple light devices (i.e., a cluster of LEDs) that direct light to a specific target. A specific target can comprise a minority of a target surface that results in a concentrated light intensity in comparison to the majority of a target surface.

Additionally, as used herein, the term "concentrated light intensity" refers to a high concentration of light intensity values in comparison to the light values surrounding space. In particular, "concentrated light intensity" refers to a concentration of light intensity values that are above a threshold level of light intensity and the surrounding light intensity values are below a threshold level of light intensity. For example, a concentrated light intensity value can comprise light intensity values within a percentage of fallout from the max lumen output value of camera flash device. In particular, a concentrated light intensity can comprise the light intensity values within 85 percent of the max lumen output value (i.e., the area where a surface received the max lumen output from the flash device and the surrounding area that received at least 85 percent of the max lumen value). In one or more embodiments, the digital image material property extraction system can determine a percentage of fallout.

During capture of images, it is assumed that the z-axis of the camera is approximately perpendicular to a planar surface. For most mobile devices, the position of the flash light is usually very close to the position of the camera, which provides a univariate sampling of isotropic BRDF. By imaging with a collocated camera and light source, the digital image material property extraction system can use additional constraints that yield better BRDF reconstructions compared to acquisition under arbitrary natural illumination.

Furthermore, the digital image material property extraction system can provide the digital image 510 to a neural network 512 to predict the material properties of the material portrayed in the digital image 510. In one or more embodiments, the neural network 512 comprises the neural network components of the digital image material property extraction system in accordance with FIGS. 1-4. As shown in FIG. 5, the digital image material property extraction system utilizes neural network 512 to predict a material property set for the digital image 510.

In some embodiments, the digital image material property extraction system can utilize post-processing methods before utilizing a rendering layer to generate a model image from predicted material property sets and one or more lighting environments. For example, as shown in FIG. 5, the digital image material property extraction system utilizes a densely connected continuous conditional random field ("DCRF") 514 to post process one or more BRDF parameters in the material property set before utilizing a rendering layer to render model image 516.

As used herein, the term "densely connected continuous conditional random field" (sometimes referred to as "DCRF") refers to a sequence modelling method. In particular, the term "densely connected continuous conditional random field" refers to a sequence modelling method utilized to predict values while utilizing surrounding predicted values as context for predicting values. For example, the digital image material property extraction system can utilize a DCRF to refine predicted BRDF parameter predictions to reduce artifacts and/or noise from predicted BRDF parameter values from a material property set.

For example, the digital image material property extraction system can utilize a DCRF to refine the diffuse color values from a neural network diffuse color decoder. For instance, a diffuse color DCRF can reduce specular highlight from a diffuse color value prediction that comprises a saturation by specular highlight. For example, the digital image material property extraction system can remove the influence of light intensity when measuring the similarity between two pixels from the predicted diffuse color vector, by utilizing an energy function of the DCRF for diffuse color predictions defined as:

$$\min_{\{d_i\}} : \sum_{i=1}^{N} \alpha_i^d (d_i - \hat{d}_i)^2 +$$

$$\sum_{i,j}^{N} (d_i - d_j)^2 (\beta_1^d \kappa_1(p_i; p_j) + \beta_2^d \kappa_2(p_i, \bar{I}_i; p_j, \bar{I}_j) + \beta_3^d \kappa_3(p_i, \hat{d}_i; p_j, \hat{d}_j))$$

For instance, in some embodiments, $\hat{d}_i$, is the diffuse color prediction at pixel i, $p_i$ is the position of pixel i, and $\bar{I}_i$ is the whitened color of the input digital image. The digital image material property extraction system can utilize the whitened color of the input digital image to remove the influence of light intensity when measuring the similarity between two pixels. Furthermore, $\kappa_i$ are the Gaussian smoothing kernels, while $\alpha_i^d$ and $\{\beta_i^d\}$ are coefficients to balance the contribution of unary and smoothness terms. Indeed, the diffuse color DCRF comprises a spatially varying $\alpha_i^d$ to allow different unary weights for different pixels. In one or more embodiments, the digital image material property extraction system utilizes lower unary weights for pixels with a saturation by specular highlights (pixels with artifacts) to smooth the artifacts at those pixel locations.

Additionally, the digital image material property extraction system can utilize the refined diffuse color predictions to improve the prediction values of other BRDF parameters. For example, in order to reduce noise in the normal vector predictions, the digital image material property extraction system can utilize a DCRF with two smoothness kernels. For instance, one kernel can be based on pixel position while the other kernel is a bilateral kernel based on the position of the pixel and the gradient of the diffuse color predictions. In some embodiments, pixels with similar diffuse color gradients often have similar normal directions. Thus, the digital image material property extraction system can utilize an energy function of a DCRF for normal prediction defined as:

$$\min_{\{n_i\}} : \sum_{i=1}^{N} \alpha^n (n_i - \hat{n}_i)^2 + \sum_{i,j}^{N} (n_i - n_j)^2 (\beta_1^n \kappa_1(p_i; p_j) + \beta_2^n \kappa_2(p_i, \Delta d_i; p_j, \Delta d_j))$$

For instance, in some embodiments, $n_i$ represents the normal vector predicted at pixel i and $\Delta d_i$ represents the gradient of the diffuse color value at a pixel i.

Additionally, digital image material property extraction system can utilize the refined diffuse color predictions and the refined normal predictions to improve the prediction values of the roughness parameter. For example, in order to achieve a more accurate roughness prediction, in some embodiments, the digital image material property extraction system utilizes a DCRF with two unary terms, $\hat{r}_i$ and $\tilde{r}_i$ and a coarse-to-fine grid search method defined as:

$$\min_{\{r_i\}} : \sum_{i=1}^{N} \alpha_{i0}^n (r_i - \hat{r}_i)^2 + \alpha_{i1}^r (r_i - \tilde{r}_i)^2 +$$

$$\sum_{i,j}^{N} (r_i - r_j)^2 (\beta_0 \kappa_0(p_i; p_j) + \beta_1 \kappa_1(p_i, d_i; p_j, d_i))$$

Moreover, in some embodiments, the digital image material property extraction system learns all of the above mentioned DCRF coefficients in an end-to-end manner. Additionally, in some embodiments, the digital image material property extraction system utilizes a multi-scale DCRF to learn the above mentioned DCRF coefficients in an end-to-end manner.

In some embodiments, the digital image material property extraction system can utilize a predicted material property set from a digital image and a rendering layer to render visual objects comprising appearance models of the material properties from the material property set. For example, FIG. 6 illustrates the digital image material property extraction system utilizing a generated material property set 602 and objects 604 with a rendering layer 606 to generate rendered objects 608.

For instance, the digital image material property extraction system can utilize a material property set 602 generated from the components of the digital image material property extraction system as described in FIGS. 1-4. For example, the material property set 602 can be generated from a digital image portraying a wood surface. Thus, the material property set 602 comprises material properties that reflect the material properties of a wood surface.

Figure 6:
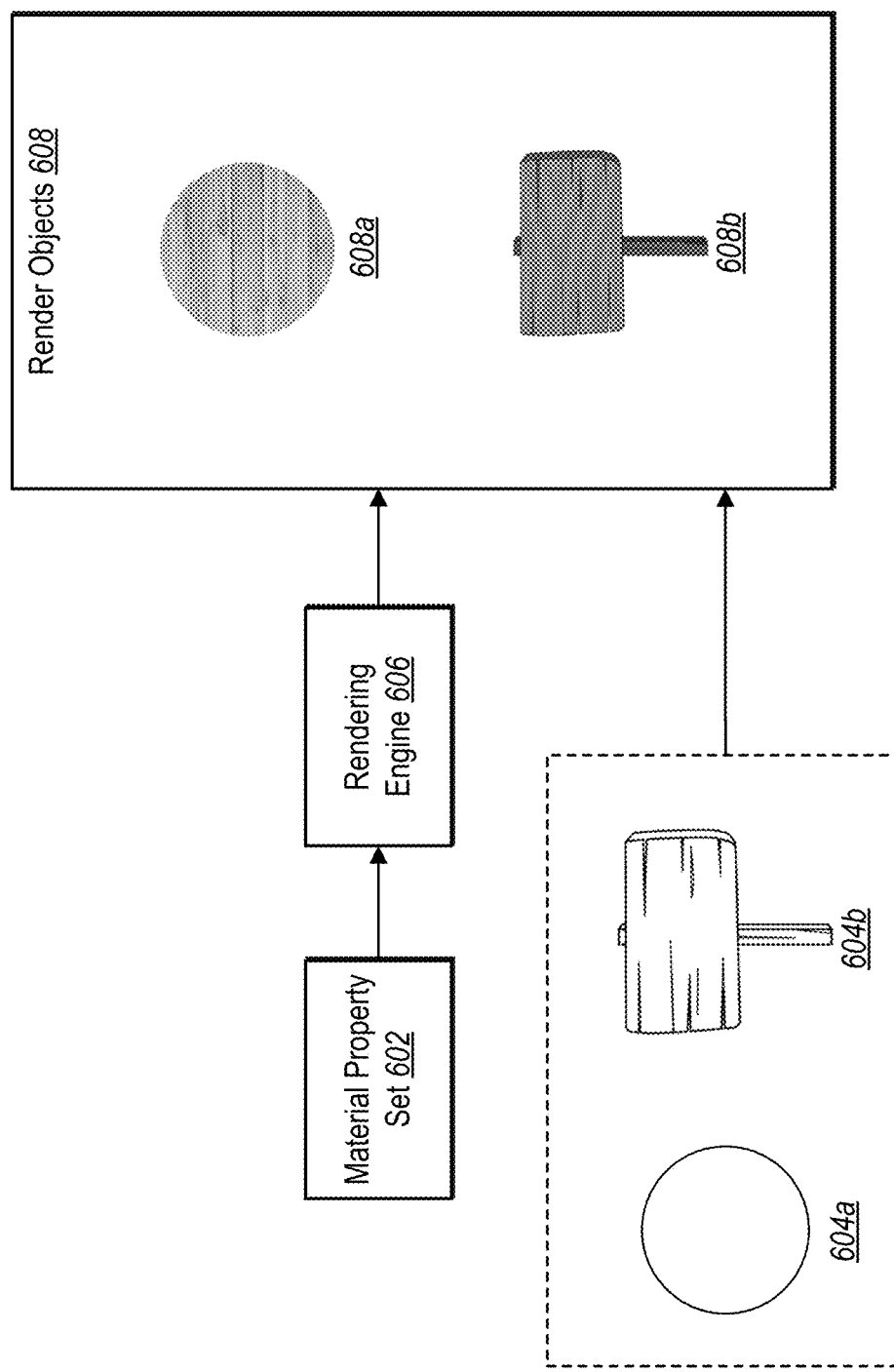
FIG. 6 illustrates a flowchart of utilizing a rendering layer to apply a material property set to visual objects in accordance with one or more embodiments.

Additionally, as shown in FIG. 6, the digital image material property extraction system provides the rendering layer 606 with objects 604. For example, objects 604 comprise a sphere 604a and a sign post 604b. In one or more embodiments, the objects 604 can be 3D objects that do not comprise of any material properties (i.e., BRDF parameters and/or material type properties). In some embodiments, the objects 604 may comprise material properties.

Furthermore, the digital image material property extraction system utilizes the rendering layer 606 to transform the objects 604 by utilizing the material property set 602. For example, the digital image material property extraction system can utilize the rendering layer 606 to render the objects 604 with the material property set 602 in one or more lighting environments (as described in FIG. 2). Thus, for instance, the sphere object 604a can be rendered to a rendered sphere 608a which resembles a material type of wood. Furthermore, the rendered sphere 608a can comprise material properties (such as the predicted BRDF parameters) to reflect light in one or more lighting environments similarly to a material type of wood. Likewise, the digital image material property extraction system can utilize the rendering layer 604 to render a rendered sign post 608b which comprises material properties that resemble a material type of wood and also reflect light in one or more lighting environments similarly to a material type of wood.

Additionally, the digital image material property extraction system can utilize the rendering layer 606 to generate rendered objects that comprise material properties for multiple lighting environments. For example, the digital image material property extraction system can utilize the rendering layer 604 to render objects that reflect light in accordance to a predicted realistic appearance model for a material portrayed in a digital image in a 3D environment with multiple light environments. For instance, the rendered 3D object can reflect light in a live 3D environment for a non-static lighting environment.

Figure 7:
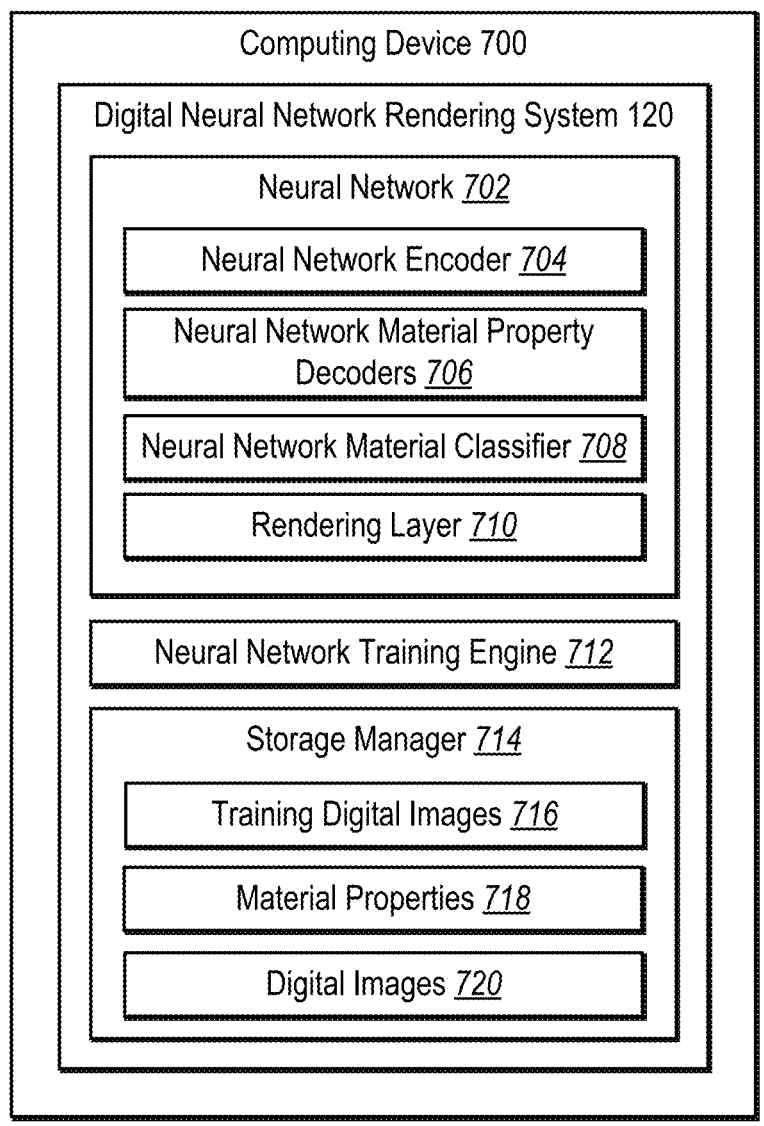
FIG. 7 illustrates a schematic diagram of a digital image material property extraction system in accordance with one or more embodiments.

Turning now to FIG. 7, additional detail will be provided regarding components and capabilities of one embodiment of the digital image material property extraction system. In particular, FIG. 7 illustrates an embodiment of an exemplary digital image material property extraction system 120 (e.g., the digital image material property extraction system referenced above) executed by a computing device 700 (e.g., a server or client device). As shown in FIG. 7, the digital image material property extraction system 120 may include, but is not limited to, a neural network 702 comprising a neural network encoder 704, neural network material property decoders 706, a neural network material classifier 708, and a rendering layer 710; a neural network training engine 712, and a storage manager 714 (comprising a BRDF Database 716, training digital images 718, material properties 720, and digital images 722).

As just mentioned, and as illustrated in FIG. 7, the digital image material property extraction system 120 may include the neural network 702. As described above, the neural network 702 can receive a digital image portraying one or more materials and predict material properties and/or render a model image from the predicted material properties. In one or more embodiments, the neural network 702 can receive a digital image comprising flash illumination. Moreover, as shown, in FIG. 7, the neural network can include the neural network encoder 704, neural network material property decoders 706, the neural network material classifier 708, and the rendering layer 710.

The neural network encoder 704 can generate one or more feature maps from the received digital image. In particular, the neural network encoder 704 analyzes a received digital image to generate one or more feature maps for various features of the digital image. In some embodiments, the neural network encoder 704 analyzes the received digital image in conjunction with an intensity distance map for the received digital image.

Moreover, as shown in FIG. 7, the neural network 702 can also include one or more neural network material property decoders 706. In particular, the one or more neural network material property decoders 706 can analyze the received digital image and/or the feature maps from the neural network encoder 704 to generate one or more predicted BRDF parameters based on the material portrayed in the received digital image. For example, the neural network material property decoders 706 can comprise of a neural network diffuse color decoder, a neural network normal decoder, and a neural network roughness decoder. The one or more predicted BRDF parameters from the neural network material property decoders can comprise diffuse color vectors, normal vectors, and roughness vectors. Additionally, the one or more neural network material property decoders 706 can predict one or more BRDF parameters for more than one material types in the digital image material property extraction system 120.

As shown in FIG. 7, the neural network 702 also includes the neural network material classifier 708. In particular, the neural network material classifier 708 can analyze the received digital images and/or the feature maps generated by the neural network encoder 704 to generate a material classification vector. For example, the material classification vector can comprise predicted material classification probabilities for one or more material types for the received digital image. Furthermore, in one or more embodiments, the neural network material classification 708 determines the material type of the material portrayed in a received digital image.

In some embodiments, the neural network 702 can combine the output of the neural network material classifier 708 and the one or more neural network material property decoders 706 to generate a material property set. For example, the neural network 702 can utilize weighted material types provided by a softmax layer from the neural network material classifier 708 and the one or more BRDF parameters from the one or more neural network material property decoders 706 to generate a material property set based on the material portrayed in the received digital image. Additionally, the neural network 702 can also refine the material property set parameters by utilizing one or more densely connected conditional random fields.

As described above, the neural network 702 can also include a rendering layer 710. In particular, the rendering layer 710 can utilize the generated material property set and a lighting environment to generate a model image that reflects the predicted material properties of the material portrayed in the received digital image. Additionally, the rendering layer 710 can generate multiple model images by utilizing multiple lighting environments with the material property set.

As shown in FIG. 7, the digital image material property extraction system 120 also includes the neural network training engine 712. The neural network training engine 712 can teach, train, guide, or inform a neural network (e.g., the neural network 702) to accurately capture material properties of a material portrayed in a digital image and/or to render a model image from the captured material properties. In particular, the neural network training engine 712 can train a neural network by providing a training digital image to the neural network and determining a measure of loss in relation to output of the neural network. For example, the neural network training engine 712 can determine a measure of loss by comparing a predicted property from the neural network 702 (e.g., a predicted material property set, a predicted BRDF parameter, and/or a predicted model image) with known training properties corresponding to the training digital image (e.g., ground truth data).

The neural network training engine 712 can also determine a measure of loss for each component of the neural network training engine 712 (e.g., a material classifier loss, material property decoder losses, and a rendering layer loss). Moreover, the neural network training engine 712 can utilize a combined measure of loss from each component of the neural network training engine 712. In some embodiments, the material property decoder losses comprise of a neural network diffuse color decoder loss, a neural network normal decoder loss, and a neural network roughness decoder loss. Additionally, the rendering layer loss can comprise loss from multiple model images rendered utilizing multiple lighting environments.

Moreover, as illustrated in FIG. 7, the digital image material property extraction system 120 also includes the storage manager 714. The storage manager 714 maintains data to perform the functions of the digital image material property extraction system 120. As illustrated, the storage manager 714 includes training digital images 716 (e.g., a repository of training digital images that can be utilized as input digital images such as the Adobe Stock 3D Material dataset), material properties 718 (e.g., properties determined by the neural network 702 for input digital images such as material types, BRDF parameters, and other corresponding material properties), and digital images 720 (e.g., a repository of digital images that can be utilized as input digital images).

Moreover, in one or more embodiments, the storage manager 714 can also include the neural network 702. For example, upon training the neural network 702, the digital image material property extraction system 120 can store the neural network via the storage manager 714 (e.g., via a server and/or a client device) for utilization in capturing material properties and rendering model images from materials portrayed in a digital image (e.g., at the server and/or at the client device as described in greater detail in relation to FIG. 8).

Each of the components 702-720 of the digital image material property extraction system 120 (as shown in FIG. 7) may be in communication with one another using any suitable communication technologies. It will be recognized that although components 702-720 of the digital image material property extraction system 120 are shown to be separate in FIG. 7, any of components 702-720 may be combined into fewer components, such as into a single facility or module, divided into more components, or configured into different components as may serve a particular embodiment.

The components 702-720 of the digital image material property extraction system 120 can comprise software, hardware, or both. For example, the components 702-720 can comprise one or more instructions stored on a computer-readable storage medium and executable by processors of one or more computing devices. When executed by the one or more processors, the computer-executable instructions of the digital image material property extraction system 120 can cause a client device and/or a server device to perform the methods described herein. Alternatively, the components 702-720 and their corresponding elements can comprise hardware, such as a special purpose processing device to perform a certain function or group of functions. Additionally, the components 702-720 can comprise a combination of computer-executable instructions and hardware.

Furthermore, the components 702-720 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-720 may be implemented as a stand-alone application, such as a desktop or mobile application. Furthermore, the components 702-720 may be implemented as one or more web-based applications hosted on a remote server. The components 702-720 may also be implemented in a suite of mobile device applications or "apps." To illustrate, the components 702-720 may be implemented in an application, including but not limited to ADOBE® PHOTOSHOP® software or ADOBE® ILLUSTRATOR® software. "ADOBE," "PHOTOSHOP," and "ILLUSTRATOR," are either registered trademarks or trademarks of Adobe Systems Incorporated in the United States and/or other countries.

Figure 8:
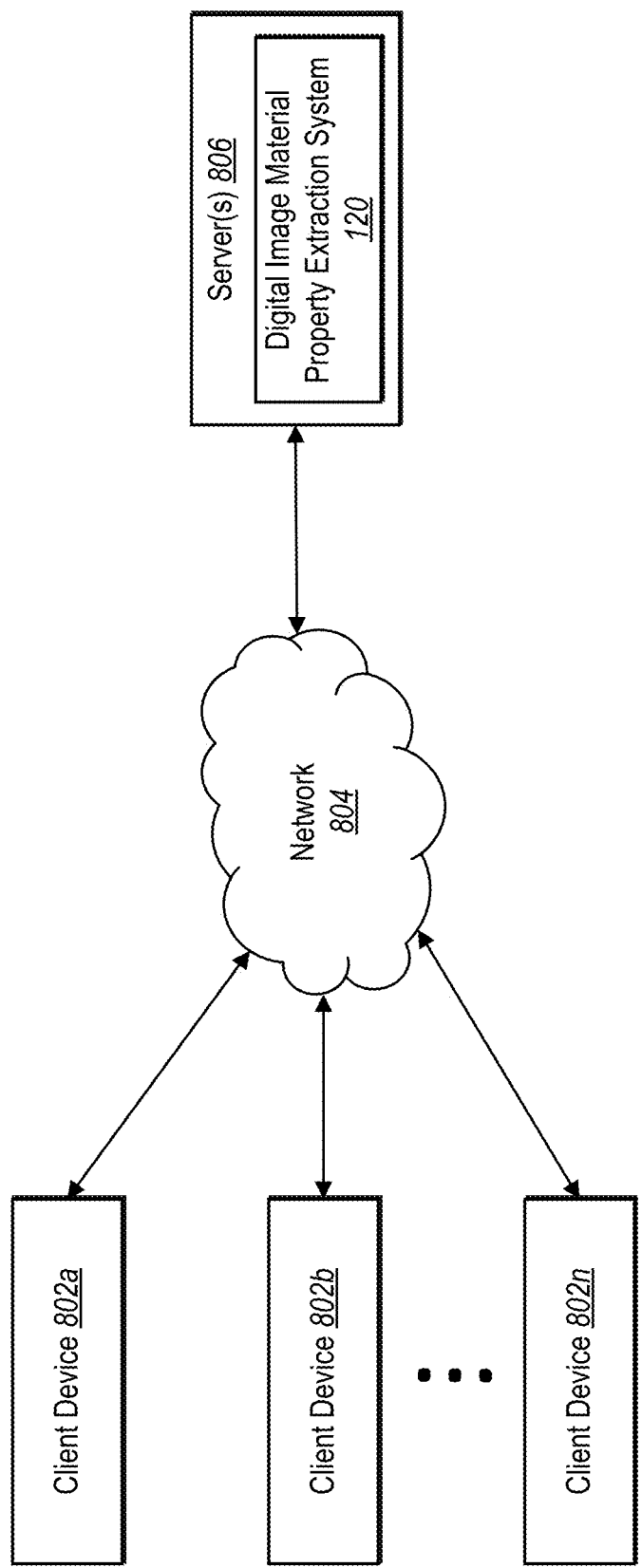
FIG. 8 illustrates a schematic diagram of an exemplary environment in which a digital image material property extraction system can operate in accordance with one or more embodiments.

FIG. 8 illustrates a schematic diagram of one embodiment of an exemplary environment 800 in which the digital image material property extraction system 120 can operate. In one or more embodiments, the exemplary environment 800 includes one or more client devices 802a, 802b, . . . 802n, a network 804, and server(s) 806. The network 804 may be any suitable network over which the computing devices can communicate. Example networks are discussed in more detail below with regard to FIG. 11.

As illustrated in FIG. 8, the environment 800 may include client devices 802a-802n. The client devices 802a-802n may comprise any computing device. For instance, in one or more embodiments, one or more of the client devices 802a-802n comprise one or more computing devices described below in relation to FIG. 11.

In addition, the environment 800 may also include the server(s) 806. The server(s) 806 may generate, store, receive, and transmit any type of data, including training digital images 716, material properties 718, and digital images 720. For example, the server(s) 806 may transmit data to a client device, such as the client device 802a. The server(s) 806 can also transmit electronic messages between one or more users of the environment 800. In one example embodiment, the server(s) 806 comprise a content server. The server(s) 806 can also comprise a communication server or a web-hosting server. Additional details regarding the server(s) 806 will be discussed below with respect to FIG. 11.

As illustrated, in one or more embodiments, the server(s) 806 can include all, or a portion of, the digital image material property extraction system 120. In particular, the digital image material property extraction system 120 can comprise an application running on the server(s) 806 or a portion of a software application that can be downloaded from the server(s) 806. For example, the digital image material property extraction system 120 can include a web hosting application that allows the client devices 802a-802n to interact with content hosted at the server(s) 806. To illustrate, in one or more embodiments of the exemplary environment 800, one or more client devices 802a-802n can access a webpage supported by the server(s) 806. In particular, the client device 802a can run an application to allow a user to access, view, and/or interact with a webpage or website hosted at the server(s) 806.

Although FIG. 8 illustrates a particular arrangement of the client devices 802a-802n, the network 804, and the server(s) 806, various additional arrangements are possible. For example, while FIG. 8 illustrates multiple separate client devices 802a-802n communicating with the server(s) 806 via the network 804, in one or more embodiments a single client device may communicate directly with the server(s) 806, bypassing the network 804.

Similarly, although the environment 800 of FIG. 8 is depicted as having various components, the environment 800 may have additional or alternative components. For example, the digital image material property extraction system 120 can be implemented on a single computing device. In particular, the digital image material property extraction system 120 may be implemented in whole by the client device 802a or the digital image material property extraction system 120 may be implemented in whole by the server(s) 806. Alternatively, the digital image material property extraction system 120 may be implemented across multiple devices or components (e.g., utilizing the client devices 802a-802n and the server(s) 806).

By way of example, in one or more embodiments, the client device 802a sends a request to the server(s) 806 to capture material properties from a material portrayed in a digital image. The client device 802a can provide the digital image to the server(s) 806. The server(s) 806 can provide the digital image as an input digital image to a neural network with neural network encoder, a neural network material classifier, one or more neural network material property decoders, and a rendering layer. The neural network can predict a material property set and/or material types from the material portrayed in the digital image (via the neural network 702). The rendering layer of the neural network (e.g., the rendering layer 710) can utilize the material property set and one or more lighting environments to generate a model image (i.e., a digital image or object that reflects the captured material properties in one or more lighting environments). Moreover, the server(s) 806 can provide model image to the client device 802a for display.

Researchers performed experiments using the digital image material property extraction system as described above. The results of the experiments are presented herein after. For the experiments, the digital image material property extraction system was trained using a dataset based on the Adobe Stock 3D Material dataset, which contains 688 kinds of materials with high resolution (4096×4096) spatially-varying BRDFs. Part of the dataset is created by artists while others are captured using a BRDF scanner. The researchers used 588 materials for training and 100 kinds of materials for testing. For data augmentation, the researchers randomly cropped 12, 8, 4, 2, 1 image patches of size 512, 1024, 2048, 3072, 4096. The researchers resized the image patches to a size of 256×256 for processing by the digital image material property extraction system. The researchers flipped patches along x and y axes and rotated patches in increments of 45 degrees. Thus, for each material type, the researchers had 270 image patches. The researchers randomly scaled the diffuse color, normal, and roughness for each image patch to prevent the digital image material property extraction system from overfitting and memorizing the materials. The digital image material property extraction system manually segmented the dataset into eight materials types.

The researchers captured images with a Huawei P9 mobile phone. The researchers captured images having a size of 3968×2976. The researchers calibrated the camera of the phone and cropped a central patch of size 2392×2392, to obtain a 43.35 degree field of view. The researchers also calibrated the position of the flash light by taking an image of a white planar surface and finding the pixel with the largest intensity as the center of flash light.

To render the synthetic dataset, the researchers set the camera parameters to be similar to a mobile phone camera. To better mimic the lighting conditions in real environments, the researchers rendered the images with a combination of a dominant point light and an environment map. The researchers used 49 environment maps, with random rotations and sampled the Microfacet BRDF model. Since the digital image material property extraction system only requires the z-axis of camera to be approximately perpendicular to the planar patch, the researchers sampled the light source position from a Gaussian distribution centered at the camera for robust training.

During training, the researchers used the Adam optimizer to train the network. The researchers set the initial learning rate to be $10^{-4}$ for the encoder, $2\times10^{-4}$ for the three decoders and $2\times10^{-5}$ for the classifier. The researchers cut down the learning rate by half every two epochs. Since the researchers found that the diffuse color and normal direction contribute much more to the final appearance, the researchers first trained the encoder-decoders for 15 epochs, then fixed the encoder and trained the roughness decoder separately for 8 epochs. Next, the researchers fixed the network and train the parameters for the DCRFs, using Adam optimizer to update the coefficients.

The researchers performed a network ablation study to show the effects of the material classifier and DCRF. Table 1 shows the results of the ablation study.

TABLE 1

| Method | basic-pt | cls-pt | clsCRF-pt | clsOnly-pt |
|---|---|---|---|---|
| Albedo ($e^{-3}$) | 7.781 | 7.489 | 7.449 | |
| Normal ($e^{-2}$) | 1.533 | 1.488 | 1.476 | |
| Roughness ($e^{-2}$) | 8.840 | 8.755 | 8.737 | |
| Rendering ($e^{-3}$) | 5.275 | 5.155 | 5.220 | |
| Classification (%) | | 76.07 | 76.07 | 57.62 |

Basic-pt is the basic encoder-decoder network architecture without the neural network material classifier 108. Cls-pt adds the material classifier neural network material classifier 108, clsCRF-pt adds the material classifier and the DCRF, and clsOnly-pt is a conventional classification network. Pt indicates that the networks were tested and trained on images with dominant point illumination.

The ablation study summarized in Table 1, shows that adding the material classifier reduces the L2 error for SVBRDF parameter and normal estimation, and rendering error. This validates the intuition that the network can exploit the correlation between BRDF parameters and material type to produce better estimates. Interestingly, training the material classifier together with the BRDF reconstruction network significantly improves performance over a pure material classification network, indicating that features trained for BRDF estimation are also useful for material recognition. Additionally, incorporating the material classifier without using its output to fuse BRDF reconstruction results does not improve BRDF estimation.

Table 2 shows a reconstruction result on one sample. PA is a state of the art material extraction system (PA), cls-env is the digital image material property extraction system trained using only images with environment lighting, and cls-pt is the digital image material property extraction system trained using only strong point light and environment illumination. Table 2 shows that both the cls-env and cls-pt versions of the digital image material property extraction system reduced the error (e.g., increased the accuracy) of material estimation, particularly in terms of the diffuse albedo. While the cls-env version of the digital image material property extraction system reduced the error compared to the state of the art system, Table 2 shows that the cls-pt version of the digital image material property extraction system provide significant increases in accuracy.

TABLE 2

|         |         | Albedo-N ($e^{-4}$) | Normals ($e^{-3}$) | Roughness ($e^{-2}$) |
|---------|---------|---------------------|--------------------|----------------------|
| [PA]    | metal   | 67.9                | 27.9               | —                    |
|         | wood    | 16.9                | 11.2               | —                    |
|         | plastic | 8.42                | 17.1               | —                    |
|         | Total   | 36.8                | 20.7               | —                    |
| cls-env | metal   | 53.9                | 23.2               | 7.76                 |
|         | wood    | 6.60                | 9.92               | 13.7                 |
|         | plastic | 3.34                | 11.8               | 15.7                 |
|         | Total   | 26.7                | 16.5               | 11.7                 |
| cls-pt  | metal   | 21.0                | 13.9               | 4.15                 |
|         | wood    | 3.63                | 8.69               | 5.75                 |
|         | plastic | 1.46                | 8.93               | 6.05                 |
|         | Total   | 10.7                | 11.1               | 5.13                 |

Figure 9:
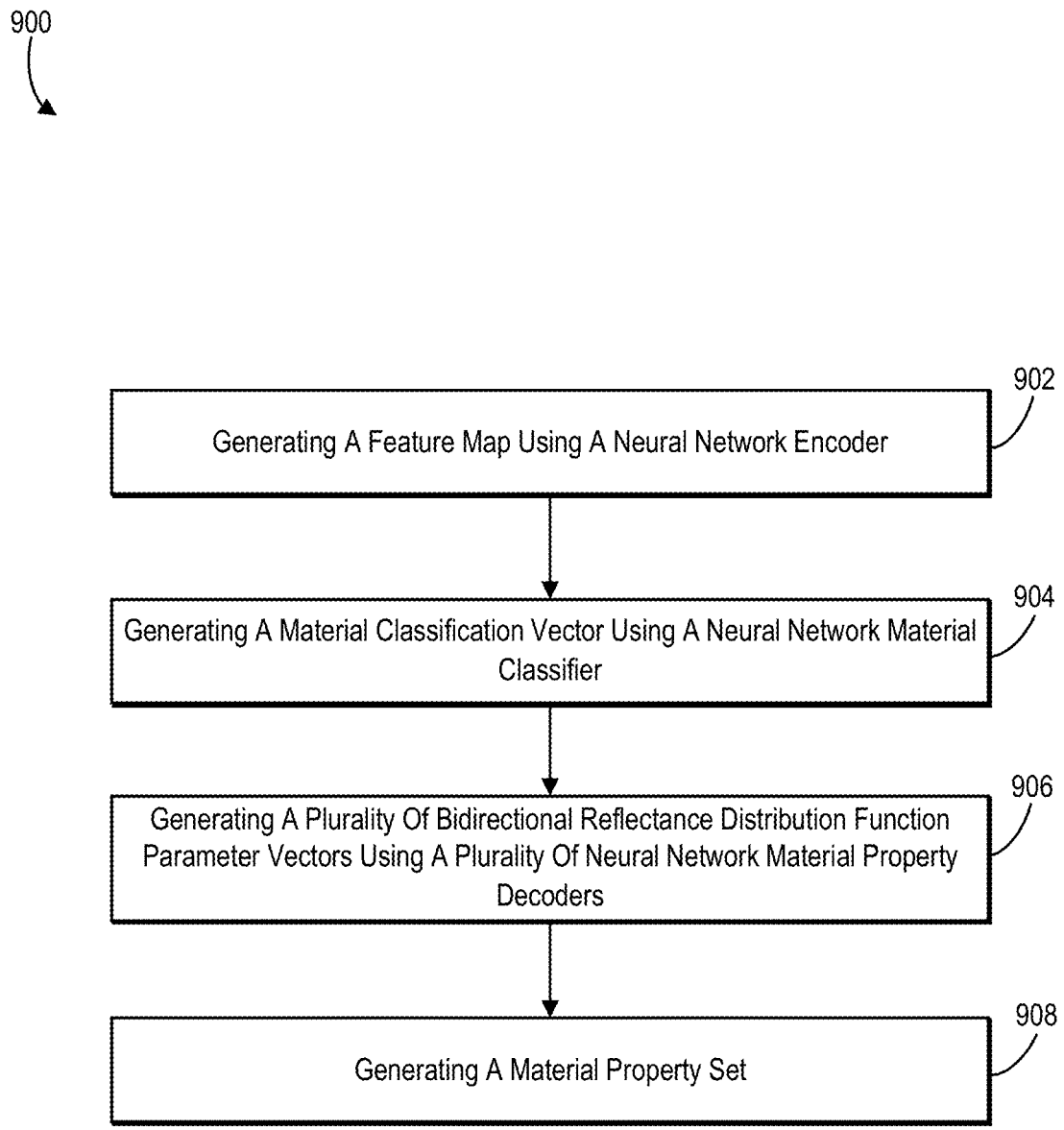
FIG. 9 illustrates a flowchart of a series of acts for extracting material properties from input digital images in accordance with one or more embodiments.

FIGS. 1-8, the corresponding text, and the examples, provide a number of different systems and devices that allow a user to extract material properties from a digital image portraying a material and/or rendering a model image based on the extracted material properties. In addition to the foregoing, embodiments can also be described in terms of a series of acts for accomplishing a particular result. For example, FIG. 9 illustrates a flowchart of a series of acts 900 for extracting material properties from input digital images in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As illustrated in FIG. 9, the series of acts 900 includes an act 902 of generating a feature map using a neural network encoder. In particular, the act 902 can include generating a feature map by processing a digital image using a neural network encoder. In addition, the act 902 can also include generating an intensity distance map comprising light intensity values corresponding to pixel coordinates of the digital image. Furthermore, the act 902 can also include generating the feature map for the digital image using the neural network encoder and the intensity distance map. Additionally, the act 902 can also include capturing the digital image with flash illumination comprising a single point light source using a concentrated light intensity.

As illustrated in FIG. 9, the series of acts 900 includes an act 904 of generating a material classification vector using a neural network material classifier. In particular, the act 904 can include generating a material classification vector by processing the feature map using a neural network material classifier. Additionally, the act 904 can also include generating the material classification vector by generating a plurality of material types and a plurality of material classification probabilities for the plurality of material types.

As illustrated in FIG. 9, the series of acts 900 includes an act 906 of generating a plurality of bidirectional reflectance distribution function parameter vectors using a plurality of neural network material property decoders. In particular, the act 906 can include generating a plurality of bidirectional reflectance distribution function parameter vectors by processing the feature map using each of the plurality of neural network material property decoders. Additionally, the plurality of bidirectional reflectance distribution function parameter vectors can include a diffuse color vector, a normal vector, and a roughness vector.

Furthermore, the plurality of neural network material property decoders can include a neural network diffuse color decoder, a neural network normal decoder, and a neural network roughness decoder. In addition, the act 906 can include generating the diffuse color vector, which comprises a plurality of diffuse color probabilities, by processing the feature map using the neural network diffuse color decoder. Additionally, the act 906 can include generating the normal vector, which comprises a plurality of normal probabilities, by processing the feature map using the neural network normal decoder. Moreover, the act 906 can include generating a roughness vector, which comprises a plurality of roughness probabilities, by processing the feature map using the neural network roughness decoder.

As illustrated in FIG. 9, the series of acts 900 includes an act 908 of generating a material property set. In particular, the act 908 can include generating a material property set for the digital image based on a combination of the material classification vector and the plurality of bidirectional reflectance distribution function parameter vectors.

Additionally, the act 908 can include determining material type weights based on the plurality of material classification probabilities for plurality of material types by utilizing a softmax layer. Furthermore, the act 908 can include determining a final material type based on the plurality of material classification probabilities for the plurality of material types. Moreover, the act 908 can include generating the material property set for the digital image by utilizing the final material type and a combination of the material type weights and the plurality of bidirectional reflectance distribution function parameter vectors.

Furthermore, the act 908 can include utilizing densely connected conditional random fields to refine one or more bidirectional reflectance distribution function parameters from the plurality of bidirectional reflectance distribution parameter vectors. Additionally, the act 908 can include utilizing densely connected conditional random fields to refine one or more bidirectional reflectance distribution function parameters from the material property set.

Moreover, the act 908 can include assigning a normal weight to one or more values of the normal vector. In particular, the act 908 can include generating a plurality of groupings, in which each of the plurality of groupings comprise an angle range. Additionally, the act 908 can include assigning a plurality of predicted normal angles from the normal vector to each of the plurality of groupings based on the angle range of each of the plurality of groupings. Furthermore, the act 908 can include generating a normal distribution percentage for each of the plurality of groupings based on the number of predicted normal angles from the normal vector associated with each of the plurality of groupings compared to the total number of predicted normal angles from the normal vector. Moreover, the act 908 can include assigning a normal weight to each of the plurality of groupings based on the normal distribution percentage for each of the plurality of groupings, wherein the normal weight increases as the normal distribution percentage decreases.

Figure 10:
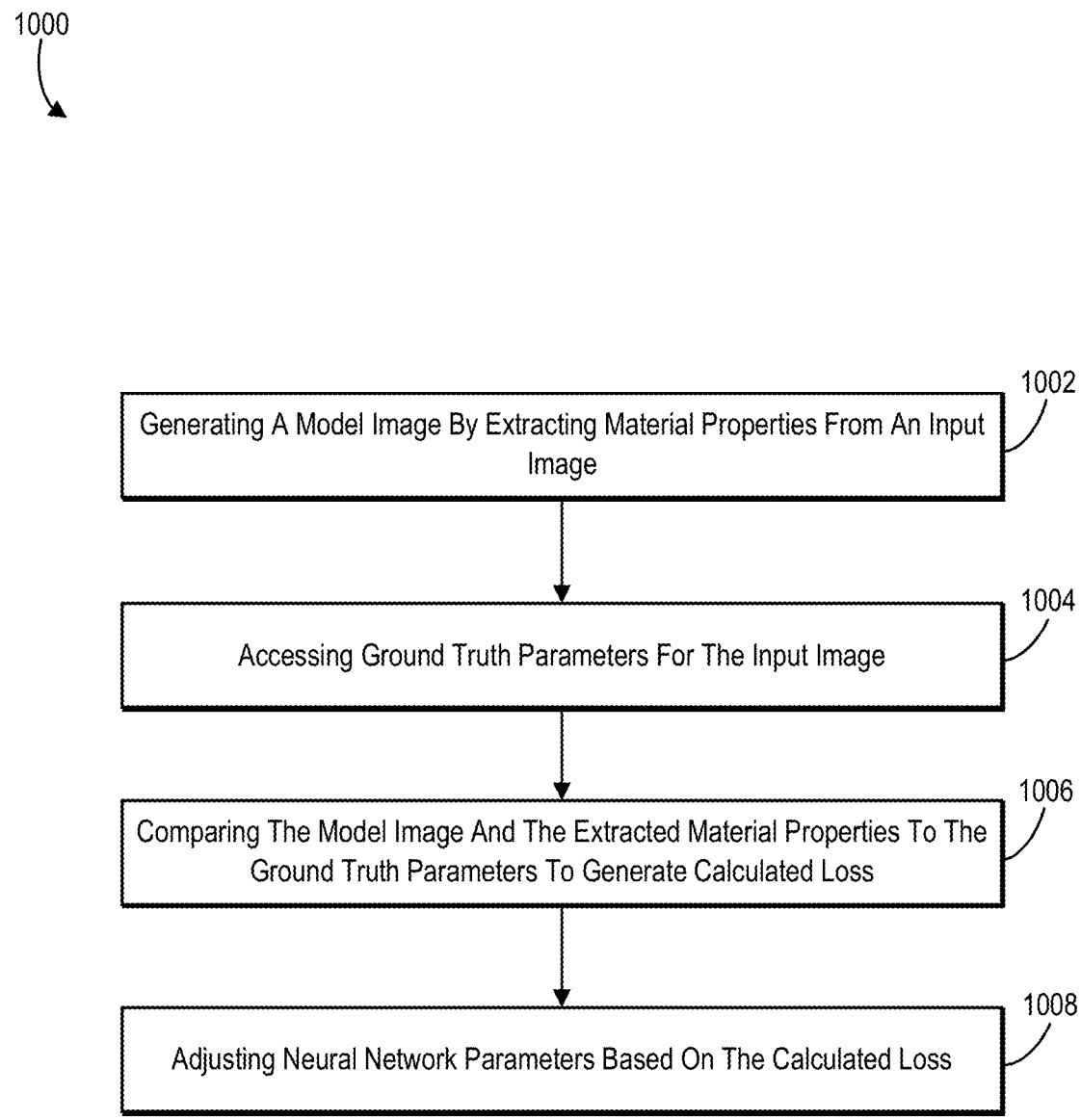
FIG. 10 illustrates a flowchart of a series of acts for training a neural network to extract material properties from a digital image and rendering a model image from predicted material properties in accordance with one or more embodiments.

Turning now to FIG. 10, additional detail will be provided regarding a flowchart of a series of acts 1000 for training a neural network to extract material properties from a digital image in accordance with one or more embodiments. As illustrated in FIG. 10, the series of acts 1000 includes an act 1010 of generating a model image by extracting material properties from an input image. In particular, the act 1010 can include extracting material properties from an input image and then generating a model image. Furthermore, the act 1010 can include generating a plurality of model images, comprising the generated material property set and a plurality of lighting environments. Additionally, the act 1010 can include generating a modified visual object by applying the material property set to a visual object.

As illustrated in FIG. 10, the series of acts 1000 includes an act 1020 of accessing ground truth parameters for the input image. The ground truth model image can comprise the digital image rendered based on a ground truth material property set and a lighting environment. Additionally, the act 1020 can include generating a plurality of ground truth parameters/images. The plurality of ground truth model images can comprise of the digital image rendered based on a ground truth material property set and a plurality of lighting environments.

As illustrated in FIG. 10, the series of acts 1000 includes an act 1030 of comparing the model image and the extracted material properties to the ground truth parameters to generate calculated loss. In particular, the act 1030 can include comparing the model image to the ground truth model image/parameters to generate a material classifier loss, a plurality of material property decoder losses, and a rendering layer loss.

As illustrated in FIG. 10, the series of acts 1000 include an act 1040 of adjusting neural network parameters based on the calculated loss. In particular, the act 1040 can include adjusting neural network parameters of the neural network encoder, the neural network material classifier, the plurality of neural network material property decoders, and the rendering layer based on a combination of the material classifier loss, the plurality of material property decoder losses, and the rendering layer loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
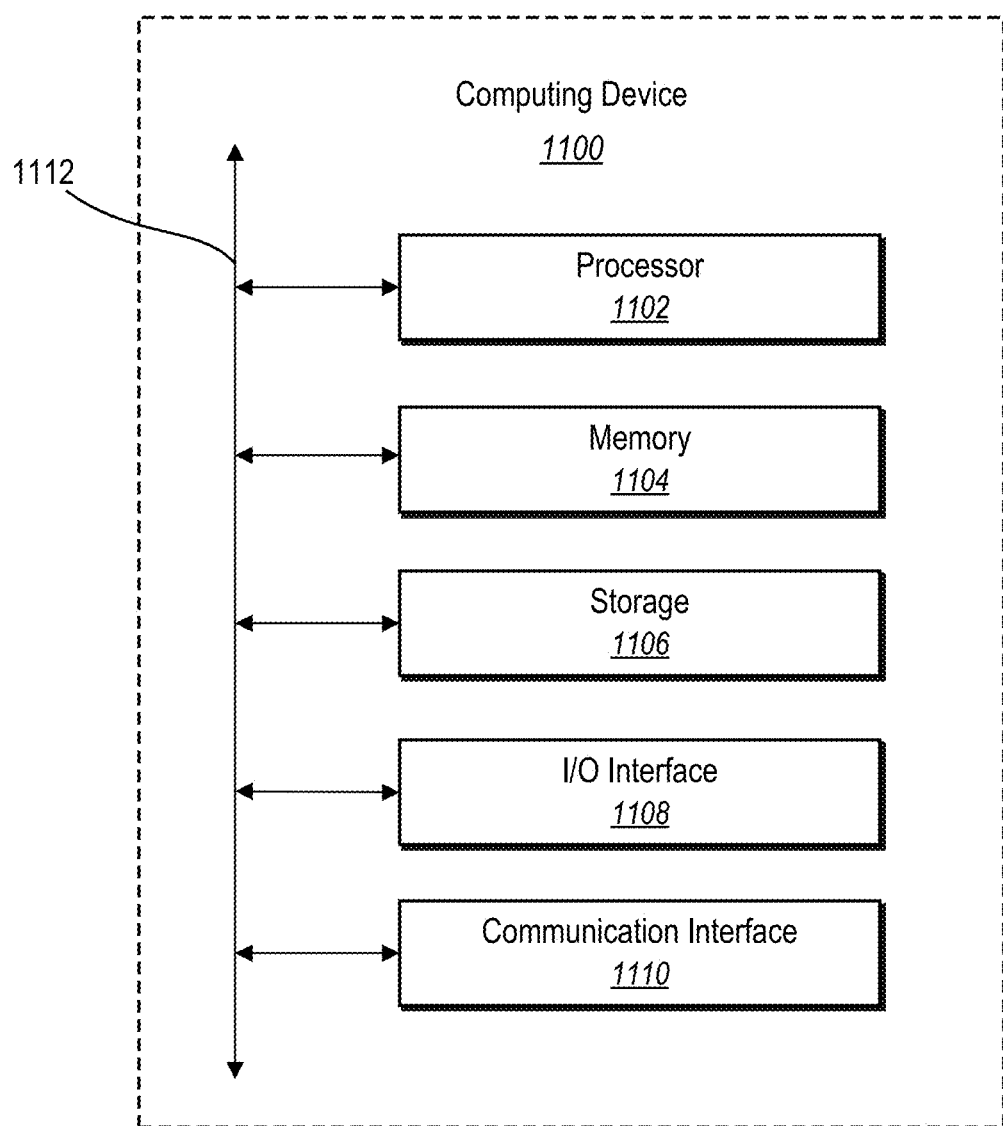
FIG. 11 illustrates a block diagram of an exemplary computing device in accordance with one or more embodiments.

As shown in FIG. 11, the computing device 1100 can include one or more processor(s) 1102, memory 1104, a storage device 1106, input/output ("I/O") interfaces 1108, and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computer system to:
   generate a feature map by processing a digital image using a neural network encoder;
   generate a material classification vector by processing the feature map using a neural network material classifier;
   generate a plurality of bidirectional reflectance distribution function parameter vectors by processing the feature map using each of a plurality of neural network material property decoders; and
   generate a material property set for the digital image based on a combination of the material classification vector and the plurality of bidirectional reflectance distribution function parameter vectors.

2. The non-transitory computer readable medium of claim 1, further comprising instructions that, when executed by the at least one processor, cause the computer system to generate the material classification vector by generating a plurality of material classification probabilities for a plurality of material types using a soft max classifier.

3. The non-transitory computer readable medium of claim 2, further comprising instructions that, when executed by the at least one processor, cause the computer system to:
   determine material type weights based on the plurality of material classification probabilities for the plurality of material types; and
   generate the material property set for the digital image by utilizing a combination of the material type weights and the plurality of bidirectional reflectance distribution function parameter vectors.

4. The non-transitory computer readable medium of claim 3, wherein the instructions, when executed by the at least one processor, cause the computer system to generate the plurality of bidirectional reflectance distribution function parameter vectors by generating a bidirectional reflectance distribution function parameter vector for each material type of the plurality of material types.

5. The non-transitory computer readable medium of claim 3, wherein the instructions, when executed by the at least one processor, cause the computer system to generate the material property set for the digital image by:
   multiplying each bidirectional reflectance distribution function parameter vector for each material type by a corresponding material type weight to generated weighted bidirectional reflectance distribution function parameter vectors; and
   summing the weighted bidirectional reflectance distribution function parameter vectors.

6. The non-transitory computer readable medium of claim 1, further comprising instructions that, when executed by the at least one processor, cause the computer system to:
   generate an intensity distance map comprising light intensity values corresponding to pixel coordinates of the digital image; and
   generate the feature map for the digital image using the neural network encoder and the intensity distance map, wherein the digital image is captured with flash illumination comprising a single point light source using a concentrated light intensity and environment illumination.

7. The non-transitory computer readable medium of claim 1, further comprising instructions that, when executed by at least one processor, cause the computer system to:
   generate a model image using a rendering layer, wherein the model image comprises the generated material property set and a lighting environment;
   generate a ground truth model image, wherein the ground truth model image comprises the digital image rendered based on a ground truth material property set and the lighting environment;
   compare the model image to the ground truth model image to generate a material classifier loss, a plurality of material property decoder losses, and a rendering layer loss; and
   adjust neural network parameters of the neural network encoder, the neural network material classifier, the plurality of neural network material property decoders, and the rendering layer based on a combination of the material classifier loss, the plurality of material property decoder losses, and the rendering layer loss.

8. The non-transitory computer readable medium of claim 1, wherein the plurality of bidirectional reflectance distribution function parameter vectors comprises a diffuse color vector, a normal vector, and a roughness vector.

9. The non-transitory computer readable medium of claim 1, further comprising instructions that, when executed by at least one processor, cause the computer system to generate a modified visual object by applying the material property set to a visual object.

10. The non-transitory computer readable medium of claim 1, further comprising instructions that, when executed by at least one processor, cause the computer system to utilize densely connected conditional random fields to refine one or more bidirectional reflectance distribution function parameters from the plurality of bidirectional reflectance distribution function parameter vectors.

11. A system for extracting material properties from input digital images comprising:
    one or more memories, comprising:
       a digital image;
       a neural network encoder;
       a neural network material classifier; and
       a plurality of neural network material property decoders; and
    at least one computing device storing instructions thereon, that, when executed by the at least one computing device, cause the system to:
       generate a feature map for the digital image using the neural network encoder;

generate a material classification vector that indicates a probability the digital image comprises each of a plurality of materials by processing the feature map using the neural network material classifier;

generate a plurality of bidirectional reflectance distribution function parameter vectors by processing the feature map using each of the plurality of neural network material property decoders; and generate a material property set for the digital image based on a combination of the material classification vector and the plurality of bidirectional reflectance distribution function parameter vectors.

12. The system of claim 11, further comprising instructions that, when executed by the at least one computing device, cause the system to:

generate the material classification vector by generating a plurality of material classification probabilities for a plurality of material types;

determine material type weights based on the plurality of material classification probabilities for the plurality of material types; and generate the material property set for the digital image by utilizing a combination of the material type weights and the plurality of bidirectional reflectance distribution function parameter vectors.

13. The system of claim 11, further comprising instructions that, when executed by the at least one computing device, cause the system to:

generate an intensity distance map comprising light intensity values corresponding to pixel coordinates of the digital image; and generate the feature map for the digital image using the neural network encoder and intensity distance map, wherein the digital image is captured with flash illumination comprising a single point light source using a concentrated light intensity.

14. The system of claim 11, further comprising instructions that, when executed by the at least one computing device, cause the system to:

generate a model image using a rendering layer, wherein the model image comprises the generated material property set and a lighting environment;

generate a ground truth model image, wherein the ground truth model image comprises the digital image rendered based on a ground truth material property set and the lighting environment;

compare the model image to the ground truth model image to generate a material classifier loss, a plurality of material property decoder losses, and a rendering layer loss; and adjust neural network parameters of the neural network encoder, the neural network material classifier, the plurality of neural network material property decoders, and the rendering layer based on a combination of the material classifier loss, the plurality of material property decoder losses, and the rendering layer loss.

15. The system of claim 11, wherein the plurality of neural network material property decoders comprises a neural network diffuse color decoder, a neural network normal decoder, and a neural network roughness decoder; and further comprising instructions that, when executed by the at least one computing device, cause the system to:

generate a diffuse color vector by processing the feature map using the neural network diffuse color decoder, wherein the diffuse color vector comprises a diffuse color probability for each of a plurality of material types;

generate a normal vector by processing the feature map using the neural network normal decoder, wherein the normal vector comprises a normal probability for each of the plurality of material types; and generate a roughness vector by processing the feature map using the neural network roughness decoder, wherein the roughness vector comprises a roughness probability for each of the plurality of material types.

16. The system of claim 11, further comprising instructions that, when executed by the at least one computing device, cause the system to generate a modified visual object by applying the material property set to a visual object.

17. The system of claim 11, further comprising instructions that, when executed by the at least one computing device, cause the system to:

generate a plurality of groupings, wherein each of the plurality of groupings comprises an angle range;

assign a plurality of predicted normal angles from the normal vector to each of the plurality of groupings based on the angle range of each of the plurality of groupings;

generate a normal distribution percentage for each of the plurality of groupings based on the number of predicted normal angles from the normal vector associated with each of the plurality of groupings compared to the total number of predicted normal angles from the normal vector; and assign a normal weight to each of the plurality of groupings based on the normal distribution percentage for each of the plurality of groupings, wherein the normal weight increases as the normal distribution percentage decreases.

18. The system of claim 11, further comprising instructions that, when executed by the at least one computing device, cause the system to utilize densely connected conditional random fields to refine one or more bidirectional reflectance distribution function parameters from the material property set.

19. In a digital medium environment for extracting material properties from input digital images, a method comprising:

performing a step for training a neural network encoder, a neural network material classifier, and a plurality of neural network decoders to generate a material property set from a single digital image comprising flash illumination;

performing a step for utilizing the neural network encoder, the neural network material classifier, and the plurality of neural network decoders to generate the material property set from the single digital image; and generating a modified visual object by applying the material property set to a visual object.

20. The method of claim 19, wherein generating the modified visual object comprising the material property set from the digital image by applying the material property set to a visual object comprises utilizing densely connected conditional random fields to refine one or more bidirectional reflectance distribution function parameters from the material property set.

* * * * *